United States Patent
Bolle et al.

(10) Patent No.: US 7,130,452 B2
(45) Date of Patent: Oct. 31, 2006

(54) SYSTEM AND METHOD FOR MULTI-PARTY VALIDATION, AUTHENTICATION AND/OR AUTHORIZATION VIA BIOMETRICS

(75) Inventors: Rudolf M. Bolle, Bedford Hills, NY (US); Chitra Dorai, Chappaqua, NY (US); Sunil J. Noronha, Chappaqua, NY (US); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 10/308,664

(22) Filed: Dec. 3, 2002

(65) Prior Publication Data

US 2004/0104266 A1    Jun. 3, 2004

(51) Int. Cl.
*G06K 9/00* (2006.01)
*G08B 29/00* (2006.01)
*G06F 17/30* (2006.01)
*G06Q 40/00* (2006.01)
*H04L 9/00* (2006.01)

(52) U.S. Cl. .................. 382/115; 340/5.81; 707/6; 707/9; 235/379; 705/44; 713/182

(58) Field of Classification Search ............ 382/115
See application file for complete search history.

(56) References Cited

U.S. PATENT DOCUMENTS

| | | | | |
|---|---|---|---|---|
| 3,896,266 A | * | 7/1975 | Waterbury | 379/114.19 |
| 5,546,523 A | * | 8/1996 | Gatto | 715/811 |
| 5,629,981 A | * | 5/1997 | Nerlikar | 713/168 |
| 5,841,886 A | * | 11/1998 | Rhoads | 382/115 |
| 5,903,882 A | * | 5/1999 | Asay et al. | 705/44 |
| 5,930,804 A | | 7/1999 | Yu et al. | 707/104 |
| 5,995,014 A | * | 11/1999 | DiMaria | 340/5.52 |
| 6,038,666 A | * | 3/2000 | Hsu et al. | 713/186 |
| 6,697,947 B1 | * | 2/2004 | Matyas et al. | 713/182 |
| 6,904,416 B1 | * | 6/2005 | Nassiri | 705/51 |
| 2004/0098339 A1 | * | 5/2004 | Malek et al. | 705/44 |

* cited by examiner

*Primary Examiner*—Joseph Mancuso
*Assistant Examiner*—Kathleen Yuan
(74) *Attorney, Agent, or Firm*—Satheesh K. Karra; Harrington & Smith, LLP

(57) ABSTRACT

A system and method for multi-party authentication is described. The multi-party authentication process uses synchronous and persistent biometrics signals received from parties to a transaction, based on a policy, to approve a transaction request. The biometrics signals preferably are expressed as compressed video signals having steganographically inserted challenge response data. Several business applications are described that are based on the multi-party authentication engine.

41 Claims, 23 Drawing Sheets

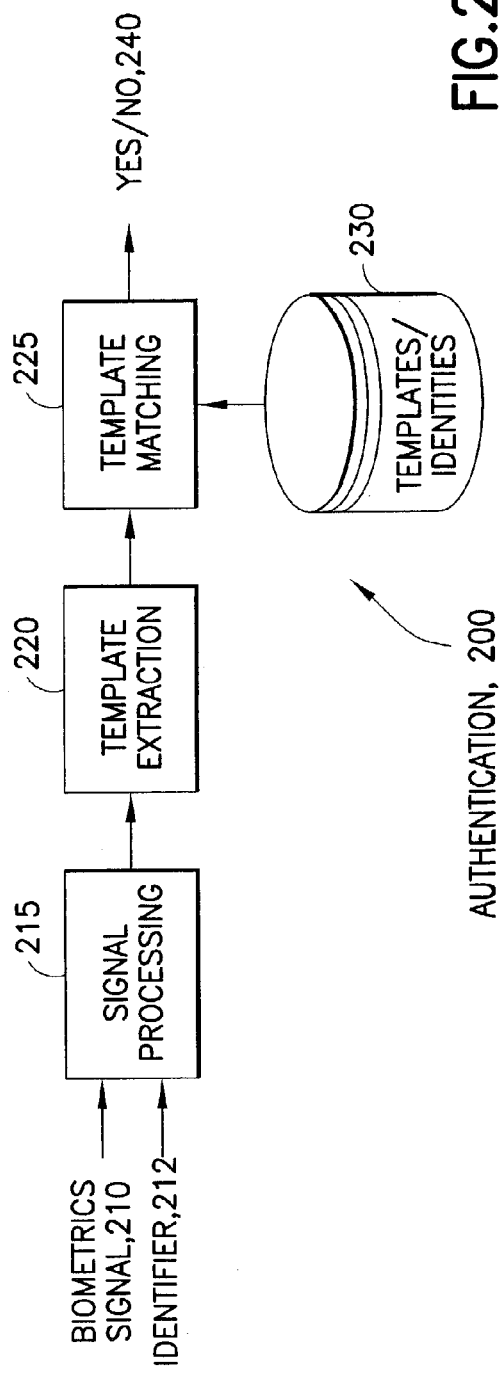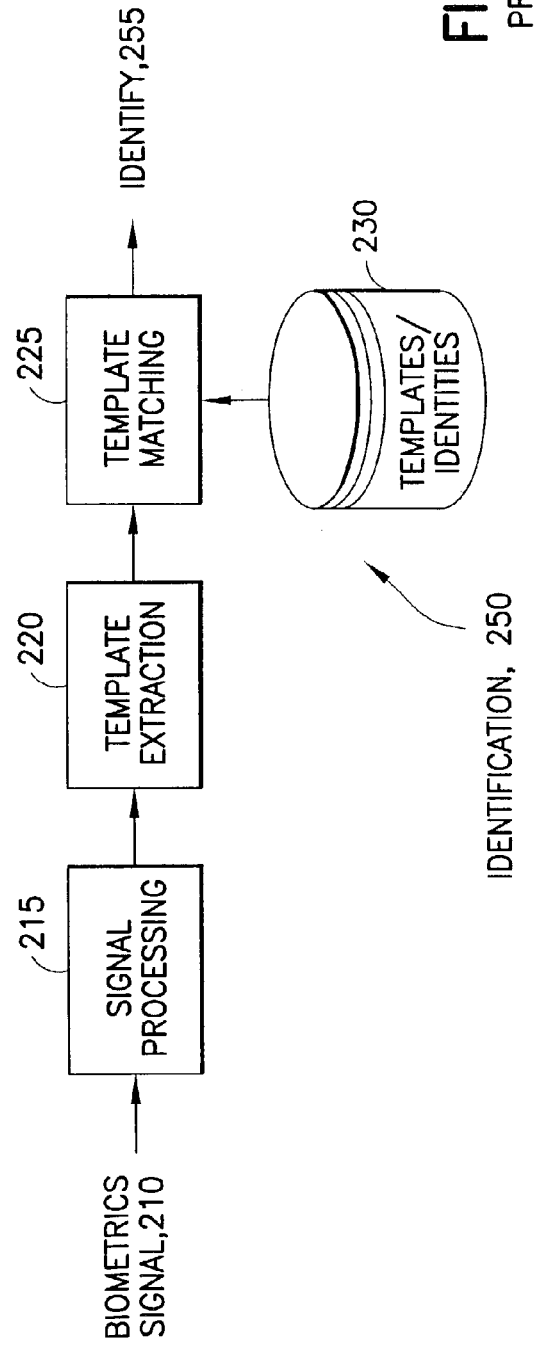

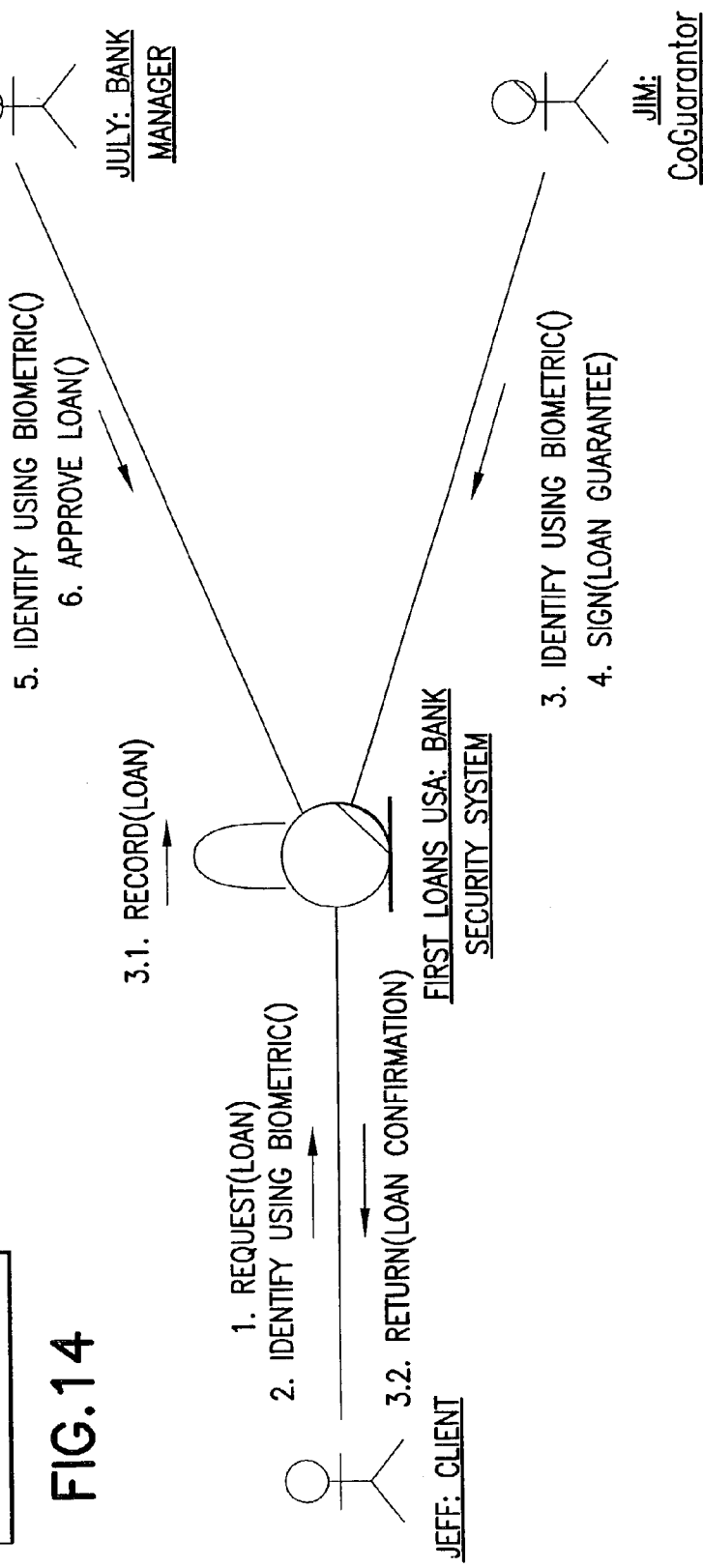

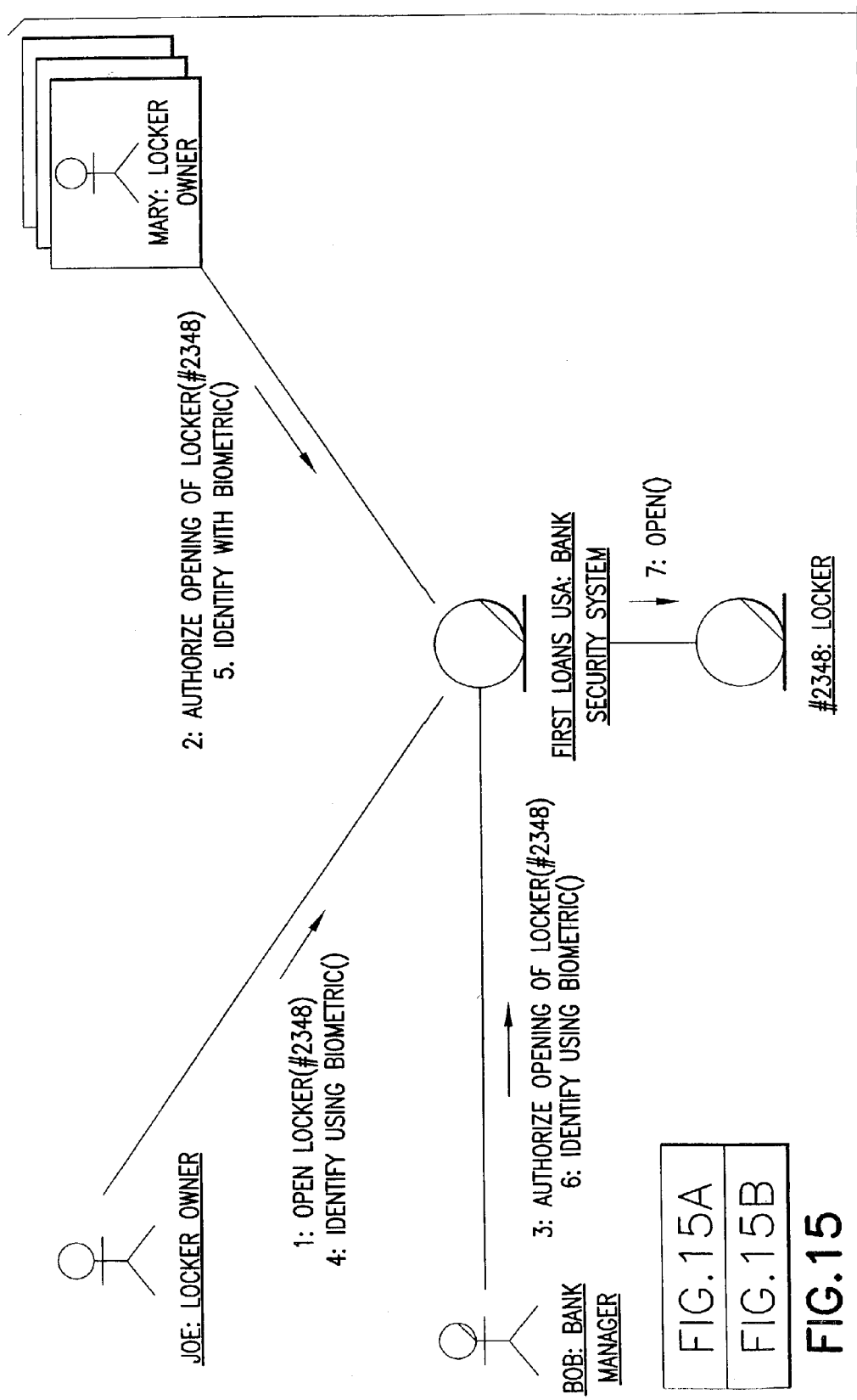

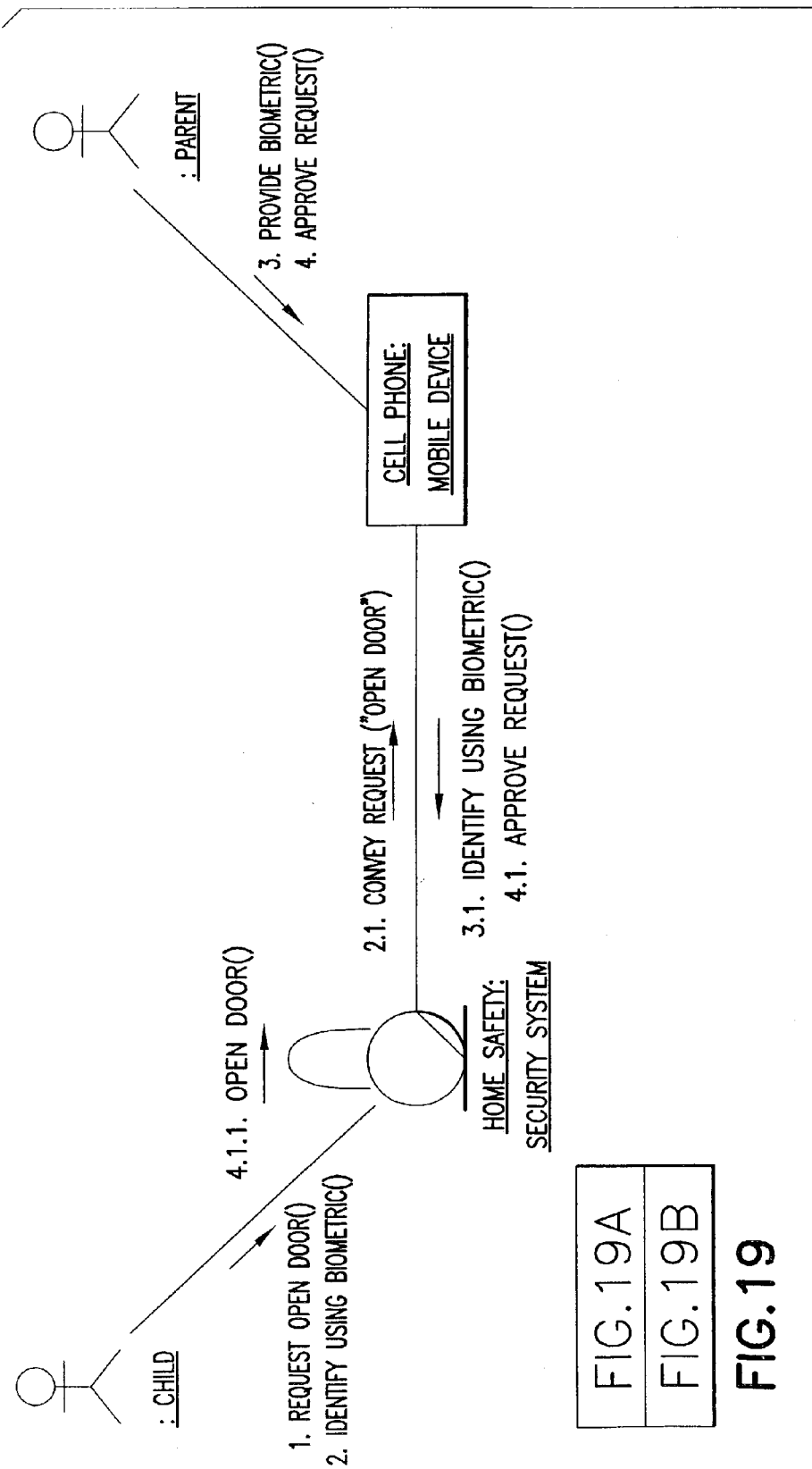

SYSTEM AND METHOD FOR MULTI-PARTY VALIDATION, AUTHENTICATION AND/OR AUTHORIZATION VIA BIOMETRICS

TECHNICAL FIELD

This invention relates generally to the field of biometrics. More specifically this invention relates methods and apparatus for recognizing, verifying, and/or authenticating more than one person at the same time using biometrics.

BACKGROUND

Traditional biometrics, such as fingerprints, have been used for (automatic) authentication and identification purposes for several decades. Handwritten signatures have long been accepted as a legally binding proof of identity, and automated signature authentication/verification methods have been available for some number of years. FIG. 1 shows examples of conventional biometrics, specifically a signature 110, a voice (print) 120, a fingerprint impression 130, and an iris pattern 140.

Such biometrics can be used for the automatic authentication or identification of a (human) subject. Typically, the subject is enrolled by offering a sample biometric when opening, for example, a bank account or when subscribing to an Internet service. From the sample biometric(s), a template is derived that is stored and used for matching purposes at the time the user wishes to access the account or service.

A biometric, ideally, will uniquely determines a person's identity. In practice, given a biometric signal, the signal is either associated uniquely with one person, or it reduces significantly a list of possible matching persons. Fingerprints are an excellent biometric due to their uniqueness between individuals. On the other hand, shoe size and weight are poor biometrics, since these parameters obviously have little discriminatory value.

Biometrics may be divided into behavioral biometrics and physiological biometrics. Behavioral biometrics depend on a person's physical and mental state, and are subject to change, possibly rapid change, over time. Behavioral biometrics include the signatures 110 and voice prints 120. Physiological biometrics, on the other hand, are subject to much less variability. For a fingerprint, the basic flow structure of ridges and valleys is essentially unchanged over a person's life time. As an example of another biometrics, the circular texture of a subject's iris 140 is believed to be even less variable over the subject's life than are fingerprints. Hence, there exist behavioral biometrics which to a certain extent are under the control of the subject, and there exist physiological biometrics whose appearance cannot be influenced (the iris 140) or can be influenced very little (the fingerprint 130).

Referring now to FIG. 2A, a typical prior-art automatic fingerprint authentication system 200 has a fingerprint image acquisition device 210 (signal acquisition device 210) that inputs data descriptive of a fingerprint to a biometrics matching system having a signal processing unit 215 for feature extraction, a template extraction unit 220 and a template matching unit 225. Along with the biometrics signal 210, an identifier 212 of the subject is input to the system. During operation of the template matching unit 225 a template associated with the particular identifier 212 is retrieved from a database of templates 230 indexed by identities (identifiers). If there is a Match/No Match between the template extracted by unit 220 and the retrieved template from database 230, a 'Yes/No' 240 answer is the output. Matching is typically based on a similarity measure, where if the measure is significantly large, the answer is 'Yes', otherwise the answer is 'No'.

Note that authentication system 200 is not limited to fingerprint authentication, as the system architecture is valid for any biometric. The biometric signal acquisition device 210 that delivers an input signal to the system 200 can be either local to the application on the client, or remote with the matching application running on some server. Hence, the architecture of the system 200 applies to all biometrics, as well as to all networked or non-networked applications.

FIG. 2B shows a prior art identification system 250. A typical automatic biometrics signal identification system 250 takes only a biometric signal from device 210 as input, and contains the signal processing unit 215 for feature extraction, the template extraction unit 220 that extracts a template from the extracted features, and the template matching unit 225. In the case of the identification system 250, only the biometric signal output from the acquisition device 210 is input to the system (not the identifier 212). During operation of the template matching unit 225 the extracted template is matched to all template, identifier pairs stored in database 230. If there exists a match between the extracted template 220 and a template associated with an identity in database 230, this identity is the output 255 of the identification system 250. If no match can be found in database 230, the output identity 255 can be set to NIL. Again, the biometric signal acquisition device 210 can be either local to the application on the client, or it can be remote with the matching application running on some server. The architecture 250 thus applies as well to networked and non-networked applications.

Of course, a single system can be used that executes both the authentication function of system 200 and the identification function of system 250.

Remote individual positive identification using biometrics is becoming widespread. However, several existing business systems and processes require the synchronous participation and authentication of multiple parties in real time. Further, new business processes can be enabled by technology that allows multiple participants to remotely authenticate themselves synchronously.

Generally, the prior art has failed to synchronously authenticate and authorize multiple parties using biometrics, particularly in a network environment.

A general approach to the (abstract) problem of authentication of the identity of a person is to reduce the problem to the problem of authentication of a concrete (tangible) entity related to the person. Typically, the problem of authenticating the identity of a person is reduced to one of a person possessing an some tangible object, e.g., permitting physical access to a building to all persons whose identities are authenticated by possession of a key; or to one of a person possessing some non-tangible information, e.g., permitting login access to a computer system to a person who knows the existence of a user-id and a password associated with the user-id. Some systems, such as ATM banking systems, use a combination of the tangible object (an ATM card) and the non-tangible information (a PIN) to establish the person's identity.

Another approach to positive identification is to reduce the problem of recognizing humans to the problem of recognizing individuals by their distinctive physiological or behavioral characteristics. This approach is referred to a biometric approach. In this case recognizing an individual can mean identifying an individual from a (possibly large)

database of identities, or it can mean authenticating an individual's identity by simply verifying that the individual's characteristics are the same or similar to stored characteristics for the claimed identity.

With the growth of the Internet (the Web) over the last few years, many commercial applications are being explored. Such systems are remotely operated and possibly unattended. For example, an e-commerce system may use a fingerprint of the customer to validate a transaction over the web, such as airline ticket purchase. A more familiar example is an ATM banking application where the bank customer is identified through the acquisition of a fingerprint impression or some other biometric information. This, again, is a networked application where customers can withdraw money from an ATM that is owned by a bank other than their own bank. Other examples of remote fingerprint authentication include point of sale transaction authorization based on fingerprints. The business systems and processes that are discussed herein are not limited to authentication of identities through the use of fingerprints.

Beyond authentication problems, where one person has to be authenticated, there are (business) processes where multiple parties have to be authenticated more or less at the same time (synchronously). The problem of authenticating each party's identity can be reduced to that of a person's possession, e.g., keys, or to that of a person's knowledge of certain information, e.g., pins and passwords. Authenticating may also be reduced to combinations of these, where hard copy biometrics (e.g., facial photographs and/or handwritten signatures) in conjunction with real-time observations of the physical characteristics are involved. Recognition by real-time voice observation is another possibility. An example of this multi-tiered approach is an ATM card (possession) coupled with a PIN (knowledge) and also with a signature (biometric). Another example would be a driver's license with a photograph and a signature. Quite often, though, the authentication problem is simply solved through the fact that the parties know one another. In this case the identity may be established through a mutual introduction by a third (trusted) party, and not through conventional means of identification. Conventional identification as considered herein can involve the use of a driver's license, a passport or an ID card such as a corporate identification card, as common examples.

Several exemplary authentication scenarios are now discussed where multiple parties have to be authenticated at the same time (synchronously), or where one or more of the identities have to be authenticated during a period of time (persistent synchronicity). The exemplary authentication scenarios include (a) a vault in a bank that can only be opened by two bank employees, where each employee has a separate key; (b) a locker or safe deposit box in a vault that is opened through the process of a bank employee opening the vault with a key (or two employees with two separate keys) and the safe deposit box owner opening his or her box with a key, in combination with a key used by the bank employee; (c) to eliminate fraud in a store, the cancellation of a transaction is approved by a manager while a checkout clerk confirms the receipt of goods and the customer authorizes the transaction to be credited to the customer's bank account; and (d) a notary public witnessing the execution of a document by verifying the identity of the signer through conventional means, and authenticating the document by signing the notary stamp.

As a further example, many official documents are signed in the presence of one or more witnesses, establishing the fact that the signature is authentic. Examples include deeds, wills and mortgages. Often at least one witness is a notary public.

It is known that in some locations where cellular telephones are pervasive, if a child has lost or forgotten his house key, he can use an intercom-like device at the door which is forwarded to the cell phone of a parent if no one is home. The parent can then remotely open the door through the use of the cell phone. Here the synchronous authentication means are the child's voice (or knowledge such as a PIN) and the parent's voice over the cell phone so that the door is opened when both biometrics are present.

Other such applications in the military and other similar areas exist, where more than one authority is required to execute a transaction, such as the release of a weapon.

In addition to the foregoing multi-party synchronous authentication scenarios, there also exist authentication scenarios where multiple parties have to be authenticated in a sequential fashion, one followed shortly by another. Examples include: (a) the purchase price of expensive items (e.g., automobiles, jewelry) can be negotiated by the buyer and a sales person, approved by signature by a sales manager, and finalized by signature of the buyer and sales person; and (b) large monetary transactions, such as the selling or buying of large blocks of stock in the stock market, may have to be authorized by multiple parties who authenticate themselves through computer passwords. These authorizations need to be done quickly as the share price of securities may be subject to large changes in small amounts of time. Other examples include, but are not limited to, corporate supervisor and manager approvals; government filings such as SEC reports; remote education, student and teacher authentication, continuing education required for job certification; board review of papers, where board members verify their opinion/vote; and a corporate board vote, where a group in authority may cast votes during a virtual meeting.

Note that the foregoing flow processes can be significantly different than the multi-party synchronous authentication scenarios described earlier.

As can be appreciated, traditional one-to-one means of mutual identification based on, by example, the recognition of the physical appearance of a person's face, or the recognition of a person's voice, are largely unreliable. This is true because such identification relies on the fact that one party has introduced himself to the other, or that the parties are introduced to each other by a trusted third party. These introductions are typically not based on true authentication methods, such as verifying a driver's license or a passport. The same problems carry forward, with additional complications, to meetings between multiple parties. An unknown party can easily join a multi-party meeting and not be detected, because each genuine party believes that the unknown party is legitimate if no other genuine party objects to the presence of the unknown party. Further, if any transaction is executed during the meeting (e.g., if the participants vote on an important decision) and the authenticity of the transaction needs to be later proved, it is generally not sufficient to have authenticated the participants at the beginning of the meeting. Instead, it may necessary to prove that all parties simultaneously participated in the transaction. This problem may be referred to as one of synchronous biometric authentication. Further, when the transaction spans a significant portion of time, it is often necessary to prove that parties were not absent during any part of the transaction (e.g., never left the meeting). This problem may be referred to as one of persistent biometric authentication.

A traditional single-party remote authentication is described in U.S. Pat. No. 5,930,804 to Yuan-Pin Yu et al. A system and method is given for Web-based biometric authentication of individuals who are using a Web Client station, where an individual seeks access to a Web Server station. At the Web Client, biometric data from an individual is measured. At an authentication center, a message is received that includes the acquired biometric from the individual seeking access to the Web Server. This biometric data is compared to selected records and if the biometric data sufficiently matches the selected records, the individual is granted access to the Web Server. In this approach multiple parties can be authenticated from different clients by the same authentication server (service), and granted access to one or more transaction servers. However, the transactions of the different parties are treated as separate, unrelated transactions.

As can be appreciated, remote individual authentication using biometrics is becoming widespread. However, several existing prior art business systems and processes require the participation of multiple parties in real time at the same locale. Existing Internet-based systems do not allow for multi-party authentication and authorization in a synchronous fashion. Hence, prior art technology has to be used to schedule a meeting of all the participants. The scheduling of such a meeting can be time-consuming, however, as each meeting participant should have a sufficient period of time available on his calendar during which the meeting can take place. Then, a meeting time and length have to be established which lies within the intersection of all periods of available time for each meeting participant. This becomes a more complicated process the larger the number of meeting participants. Additional problems with these prior art systems and methods are the travel times of the participants, and other unproductive details, which are known to those who are skilled in the art.

One technique for multiple parties to sign a digital document is by the use of certificates. However, these certificates do not support simultaneous real-time signatures, or the presence of the signatories, over an extended period of time. Nor do they link the signatures to the signers in a non-repudiable manner, as fingerprints or other biometrics can do.

As such, new and advanced e-business processes cannot be enabled by existing technology that allows only a single party to authenticate himself or herself.

SUMMARY OF THE PREFERRED EMBODIMENTS

The foregoing and other problems are overcome, and other advantages are realized, in accordance with the presently preferred embodiments of these teachings.

In one aspect this invention provides a system and method for identifying, verifying, and/or authenticating biometrics of two or more persons simultaneously.

In another aspect this invention provides a system and method for identifying, verifying, and/or authenticating biometrics of two or more persons within a prescribed time period.

In another aspect this invention provides a system and method for identifying, verifying, and/or authenticating biometrics of two or more persons that are sampled within a time period.

In accordance with a further aspect this invention provides a system and method for identifying, verifying, and/or authenticating biometrics of two or more persons continuously within a time period.

This invention provides a system and a method for multi-party authentication based on synchronous biometrics and on persistent biometrics. The teachings of this invention can be applied with advantage to business processes to develop e-commerce and on-line business applications that are not possible using conventional approaches to human identification, verification and authentication. The teachings of this invention can also be applied with advantage to other, more traditional business processes to provide new and enhanced customer services, such as enabling access to a safe deposit box outside of normal bank hours.

As opposed to the conventional single party remote authentication techniques, such as the one described in U.S. Pat. No. 5,930,804 by Yuan-Pin Yu et al., this invention enables more sophisticated business processes in which multiple parties coordinate in order to control access to protected resources, as opposed to simple, traditional single person-based processes. This invention can be used to achieve higher levels of security, as well as to implement important applications such as co-guarantorship, which would otherwise be very difficult or impossible to realize in an electronic, network-based system. The use of real-time biometrics is employed for accurately authenticating the individuals involved in a multi-party transaction, as well as for enforcing coordination policies (e.g., simultaneous authorization to release assets; uninterrupted presence of the parties during the entire transaction).

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2 shows a block diagram of an automated biometrics system for authentication (FIG. 2A), and a block diagram of an automated biometrics system for identification (FIG. 2B).

DETAILED DESCRIPTION OF THE PREFERRED EMBODIMENTS

Figure 1:
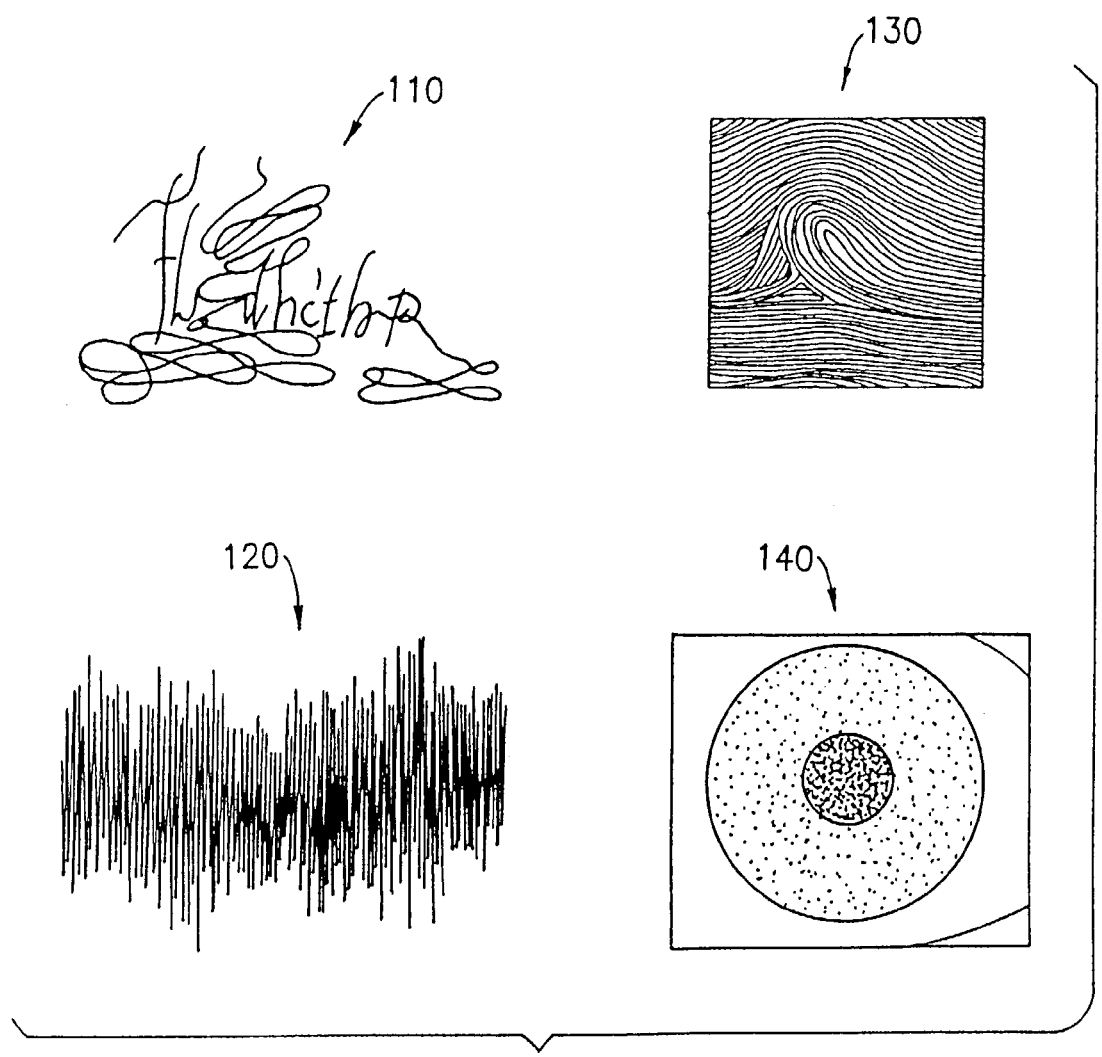
FIG. 1 shows examples of conventional biometrics.
Figure 3:
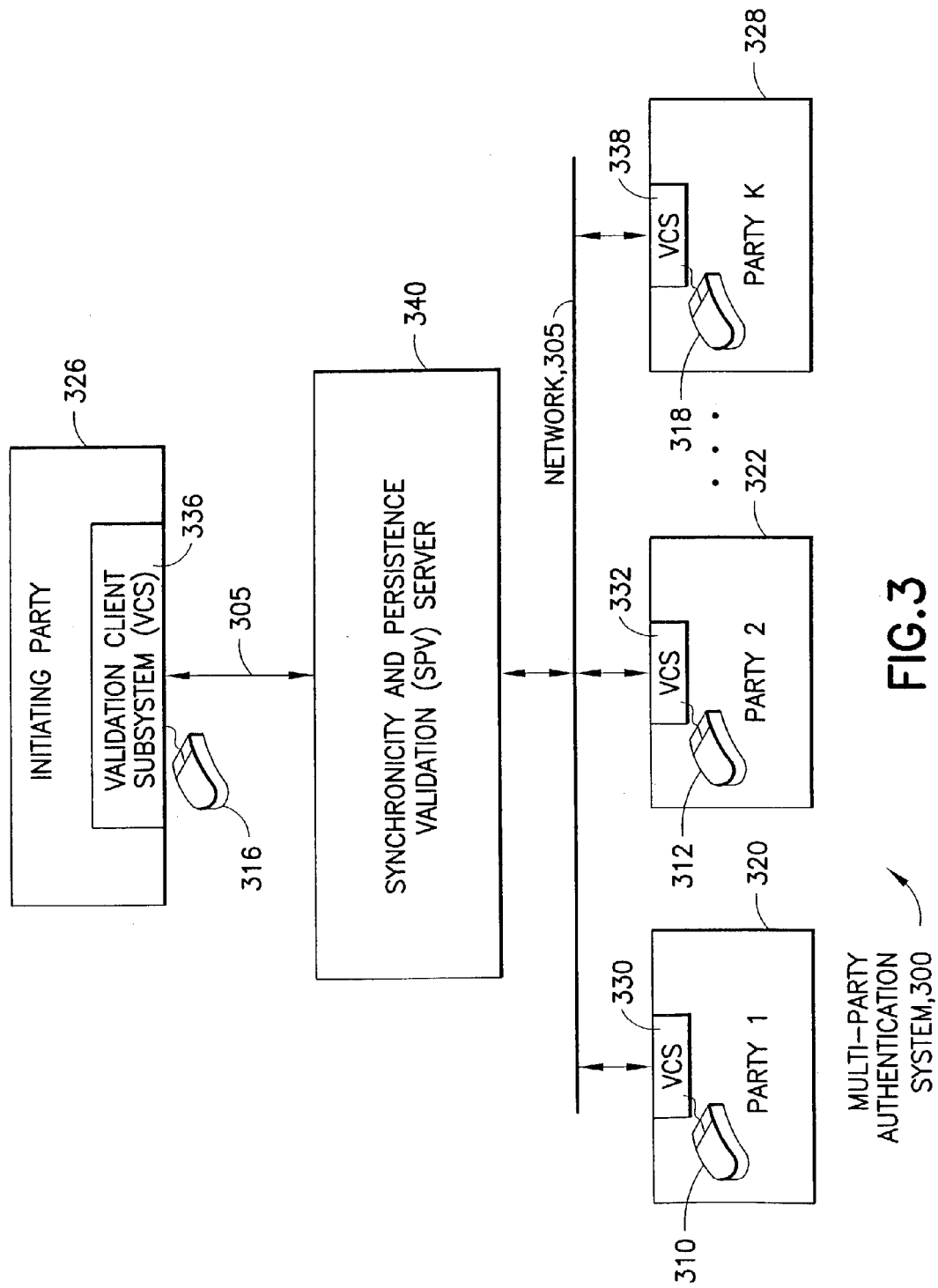
FIG. 3 is a high-level architecture of a multi-party biometric system where each party's biometric is centrally processed on one or more synchronicity and persistence validation servers.

FIG. 3 presents a high-level architecture diagram of a multi-party authentication system 300 where each party (e.g., an initiating Party, Party 1, Party 2, Party K) is centrally authenticated on one of a plurality of authentication servers, referred to herein as a Synchronicity and Persistence Validation (SPV) server 340. For the purposes of this invention the SPV server 340 may be considered to be a multi-component transaction management server. A network 305 can be a public network, such as the Internet (the Web), or it can be a private network. Bidirectionally connected to the network 305 are a plurality of client computer devices, or more simply clients 320, 322, . . . , 328. A client can be any suitable computer device, such as a workstation or a portable computer or a handheld device, such as a communications device that contains a computer (e.g., a microprocessor), that has a user interface through which a user can communicate with other devices on the network 305. Beyond the traditional user interface there are other input devices 310, 312, . . . , 318 on clients 320, 322, . . . , 328 for acquiring biometric signals. The acquired biometrics signals are processed, such as by being compressed, enhanced and/or analyzed, by validation client subsystems (VCS) 330, 332, . . . , 338. The biometric signals, such as those representing one or more of fingerprints, voice prints and/or retinal images, can be authenticated through processes, as described in FIG. 2B, on the authentication servers (SPV servers 340) where biometrics templates 220 are computed and compared 225 (matched) to stored templates in database 230. In the system of FIG. 3 multiple authentication servers/database pairs may be used. In this case, for every party's user ID, not only the userID is known, but also an identifier for an associated authentication server is known. The biometrics templates 220, database 230 and the other related components can form a part of a biometrics processor component 348 of the SPV server 340, as described below in reference to FIG. 4.

It should be appreciated that one or more of the clients 320, 322, . . . , 328 can be embodied as cellular telephones or personal organizers having an integrated digital camera or an integrated biometric scanner, such as a fingerprint scanner, that function as the biometrics acquisition devices 310, 312, . . . , 318, and where the bidirectional connection to the network 305 can be made through one or more RF channels via a cellular operator. Another biometrics input in this case may be the user's voice signal, suitably digitized and compressed.

It should thus be appreciated that the input devices 310, 312, . . . , 318 may be implemented using video capture devices such as digital cameras that generate images of a portion of each user at each client input devices 310, 312, . . . , 318, such as an image of a fingerprint, an image of the user's face, an image of the user's iris or retina, or any other part of the user that is suitable for use in generating biometrics input data, The image data may be transmitted as, for example, 30 frames per second (or less) video data, or at super-video rates (greater than 30 frames per second), or it may be compressed such as by using MPEG techniques, before being transmitted to the network 305. The use of compressed image data is also useful for concealing client 320, 322, . . . , 328 responses to challenges issued by the SPV server 340, as will be described in detail below with regard to FIG. 11.

At least one of the Synchronicity and Persistence Validation (SPV) servers 340 is connected to the network 305, and communicates with the various clients 320, 322, . . . , 328 via their respective VCS 330, 332, . . . , 338.

Real-time biometrics are herein considered to include first certificates that witness the simultaneous acquisition of biometrics signals from multiple parties, and second certificates that prove that the parties continuously provided the biometrics signals over an unbroken interval of time. Business processes based on this technology are thus within the scope of this invention. These business processes can include, but not limited to, remote, web-based-authorization of access to bank safety deposit boxes controlled by a designated bank officer and the account owner.

Figure 4:
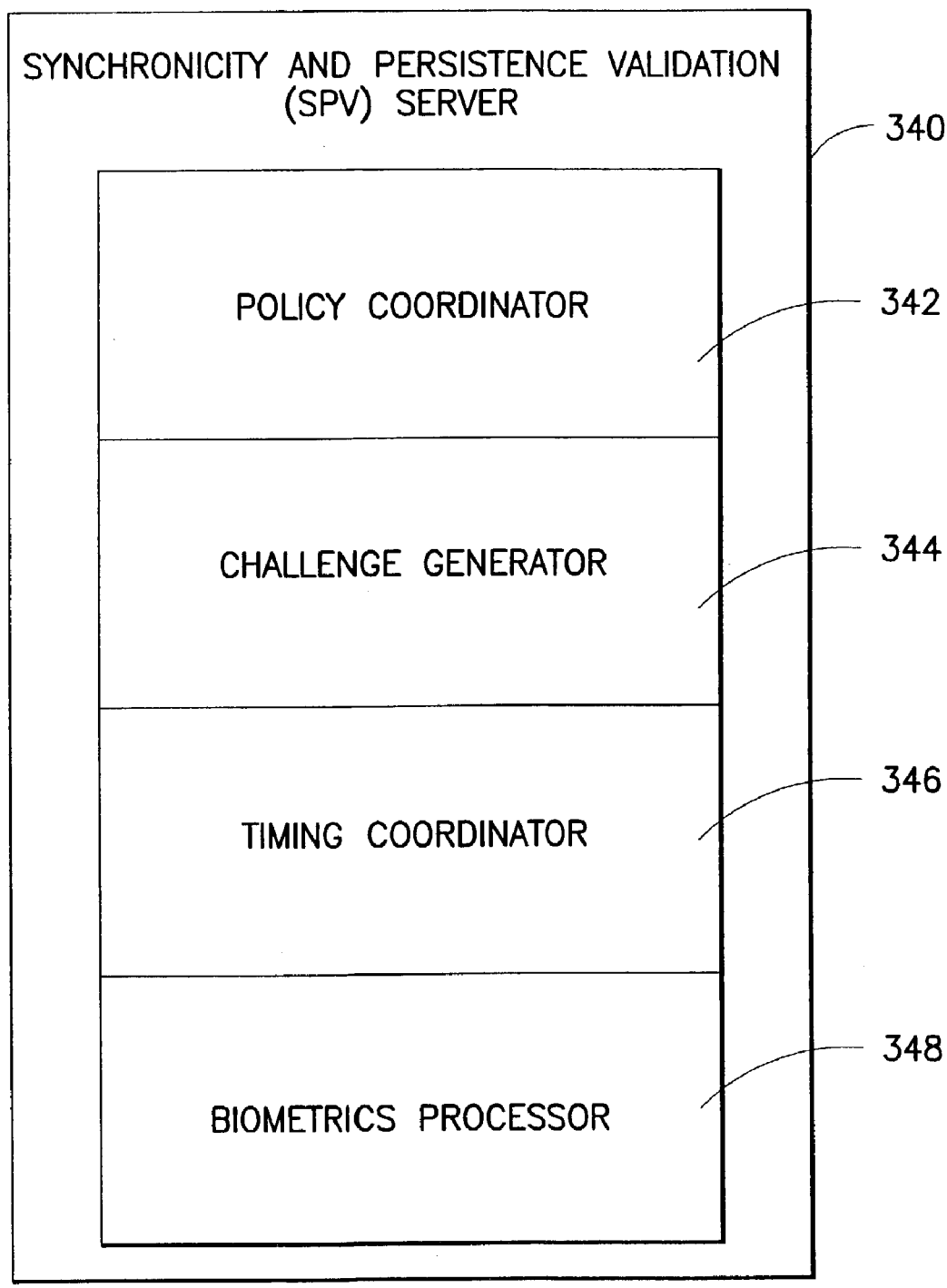
FIG. 4 is a block diagram that illustrates various components of the synchronicity and persistence validation server of FIG. 3.

Referring to FIG. 4, the SPV server 340 includes a policy coordinator 342, a challenge generator 344, a timing coordinator 346, and a biometrics processor 348. The biometrics processor 348 can be constructed to incorporate the components shown in FIG. 2, or multiple instances of the components shown in FIG. 2. The subsystems of the SPV server 340 represent four underlying core technologies that provide for: the generation of a (common) challenge to (all) the clients 320, 322, . . . , 328 by the challenge generator 344 of the SPV server 340; an algorithm at each client 320, 322, . . . , 328 to respond to the challenge (part of the VCS 330, 332, . . . , 338); an algorithm at each client 320,322, . . . , 328 to combine the basic biometrics signals with a response to the challenge (also part of the VCS 330, 332, . . . , 338); and an algorithm at the SPV server 340 (the policy coordinator 342) to ascertain the "policy" desired by the user towards synchronicity and persistence, and to verify, using the timing coordinator 346 and the biometrics processor 348, that the desired policy has been satisfied.

A naive approach to providing an authentication service using prior art techniques may involve the following steps:
1. Client handles the authentication issues;
2. At the start of the transaction, the central server delegates authentication to the clients based on site policy;
3. At the end of the time period, the clients report to the sever the authentication results; and
4. The server makes the final decision on the transaction.

Figure 5:
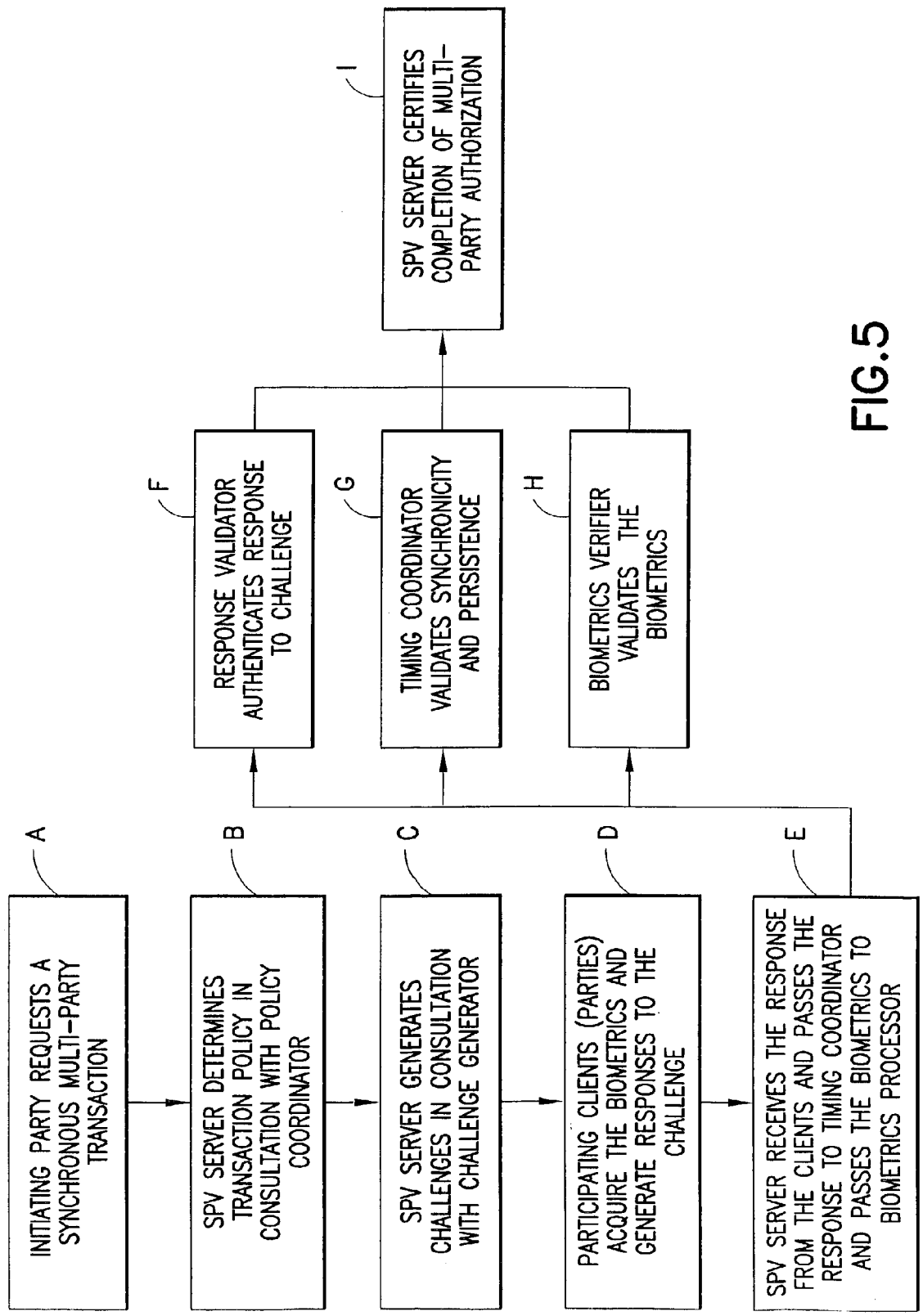
FIG. 5 is a flow chart of a multiparty challenging process with optional continuous operation.

This approach resembles a simple workflow system, and furthermore is not secure. However, a preferred embodiment of the invention operates as shown in FIG. 5, where a user (e.g., the initiating party) initiates a synchronous, multi-party transaction at the client 326 (Block A). The client 326 contacts the designated SPV server 340 for the transaction. The SPV server 340, based on the policy defined for the type of the transaction, as maintained by the policy coordinator 342, contacts the other parties (e.g., Party 1, Party 2, . . . , Party K) defined by the policy. The SPV server 340 then requests the parties to provide their biometrics signals, and also generates a common challenge to all of the involved parties (Blocks B and C). At Block D the clients 320, 322, . . . , 328 receiving the challenge add their response to the biometrics stream. In the presently preferred, but non-limiting embodiment the client response data is inserted steganographically into a compressed video stream, as described below in reference to FIG. 11. The SPV server 340 separates the biometrics signals and the response from each of the clients 320, 322, . . . , 328 and passes the response to the timing coordinator 346, and passes the biometrics signals to the biometrics server or verifier 348 (Block E). A time stamp of the clients 320, 322, . . . , 328 and the SPV server 340 is one example of a response to the SPV server initiated challenge. The responses received from clients 320, 322, . . . , 328 are used to determine whether the biometrics signal acquisition was synchronous, and whether the biometrics signals persisted for at least the duration of time specified by the policy (Blocks F, G, H, which may be executed in parallel as shown). The SPV server 340, based on the results of the processing at Blocks F, G and H, then certifies (if appropriate) the completion of the multi-party authorization (Block I) requested by the initiating party at client 326.

In summary, the steps involved include: on receipt of the transaction request, the SPV server 340 contacts all the parties involved; the SPV server 340 generates a continuous set of common challenges for all the involved clients; locally, the clients acquire the biometrics, respond to the challenge and send the biometrics streams to the SPV server 340; the SPV server 340 verifies that the signals are not stale (to prevent a replay attack) by checking the correctness of the responses to the challenges (e.g., by checking the timing of the responses relative to the time that the challenge(s) were issued); and the SPV server 340 authenticates all, or selected portions, of the biometrics signals against stored templates.

The components used during the foregoing processing include, but need not be limited to: (a) clock synchronization through a stream of challenges generated by the SPV server 340, e.g., time stamp, mean of every data frame, variance of every data frame, and pseudo-random coded sets of challenges; (b) liveness detection using challenge/response at the image level; or (c) data hiding in compressed bit streams and image content-based hash functions that may be used as keys for encoding the challenge response into an auxiliary channel of video or other data transmitted over the network 305 to the SPV server 340.

Figure 6:
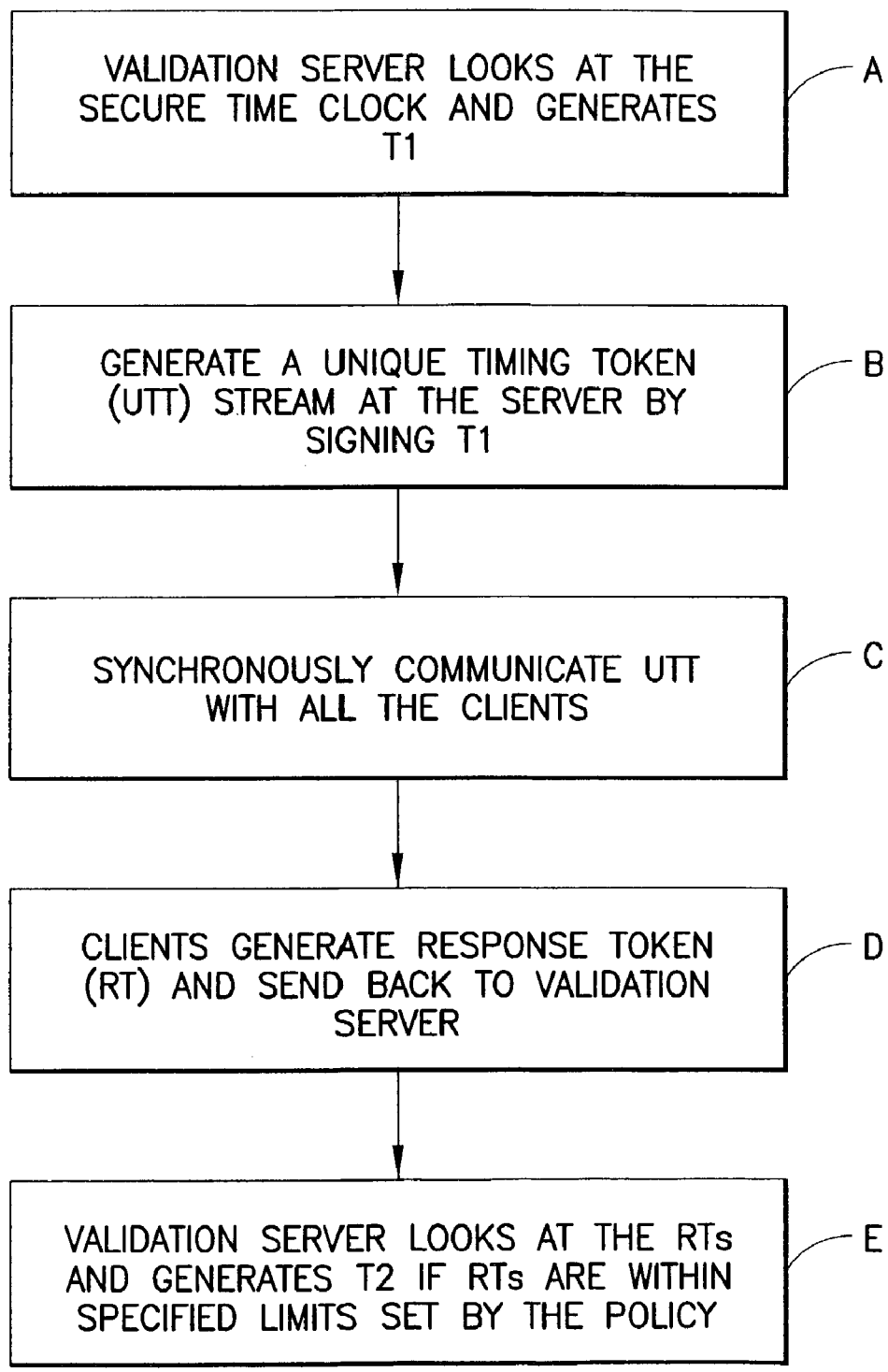
FIG. 6 is a flow chart of a timing coordinator process.

Synchronicity is implemented and guaranteed via a SPV server 340 controlled protocol. An example of this protocol is shown in FIG. 6, although other embodiments may be used as well. The timing coordinator 346 of the validation server first generates a time stamp T1 using a trusted (secure) internal clock (Block A). Alternatively, a third-party Trusted Time Server (TTS), which generates reliable time stamps, can be used. The SPV server 340 signs the time stamp to generate a Unique Time Token (UTT) stream at Block B. Two properties of this Unique Time Token are: (a) it contains sufficient information relating to the time stamp for the SPV server 340 to reconstruct the time stamp at a later time, if necessary; and it contains sufficient identification information so that it is uniquely identifiable as having been created by the given SPV server 340, and by no other entity. One possible implementation of this property utilizes public-key certificates and digital signatures. A further embodiment uses biometrics as the embedded identification information. The biometrics can be those of a "nominal officer" of the SPV Server 340 organization, or those of an actively participating person belonging to that organization. Each of these possible embodiments, as well as others are determined and controlled by the Policy coordinator 342. At Block C the UTT is transmitted to the participating clients 320, 322, . . . , 328 (those parties that are to be synchronously validated). The method being described may assume that the same UTT is multi-cast to all of the participating parties. One variant of this approach is to generate different UTTs for each client 320, 322, . . . , 328, e.g., by including one of their identification codes (such as their public key) within the UTT. At Block D each of the clients 320, 322, . . . , 328 signs the UTT to generate a Response Token (RT). In the method being described the RT contains the complete UTT, and in addition, contains sufficient identification information to uniquely identify the client party. The client's biometric signals (e.g., fingerprint, and/or voice print; and/or iris pattern) obtained from devices 310, 312, . . . , 318 are thus attached to the time stamp originally generated by the Timing Coordinator 346, enabling non-repudiation. The RT of each client 320, 322, . . . , 328 is transmitted back to the validation server portion of the SPV server 340 (Block D). In one variation to this method the RT is transmitted to a separate Transaction Processor (not shown) that coordinates all of the responses for the SPV server 340. At Block E the SPV server 340 authenticates each sender of the RT if the RTs are within the specified limits set by the policy. Further in this regard, upon receiving each RT, the Timing Coordinator 346 generates a new time stamp T2, and compares it to the original time stamp T1 embedded in the RT. As an optional service, the SPV server 340 certifies that the client's response was performed after time T1 and before time T2. As another variation of the method, if the difference between the time stamps exceeds a threshold (which can optionally be configured by the policy coordinator 342), the SPV server 340 can reject the response, thus ensuring tight synchronicity to within the parameters established by a desired policy maintained by the policy coordinator 342. Still referring to Block E, the SPV server 340 compares the RTs obtained from all participating clients 320, 322, . . . , 328 and computes the intersection of their <T1, T2> time intervals. If this intersection interval is smaller than a threshold of synchronicity (whose granularity may optionally be controlled by the policy coordinator 342), the SPV server 340 certifies the transaction as being a synchronous multi-party transaction meeting the needs of the application domain, as specified by the applicable policy. In an alternate embodiment the SPV server 340 identifies and reports the count of the subset of participants that performed the transaction with the desired synchronicity, as this approach may be sufficient for some applications such as electronic voting (eVoting).

While the above-described method assumes that time is measured with a reasonably accurate clock, and does not require knowledge of the absolute time, e.g., Universal Coordinated Time (UTC); a Trusted Time Server calibrated to UTC may be used to certify that the transaction not only occurred synchronously between multiple parties, but that the transaction also occurred at a specified absolute moment in time. The Trusted Time Server could form a part of the Timing Coordinator 346, or it could be a third party service.

A further embodiment employs multiple clocks residing on the clients 320, 322, . . . , 328, rather than relying on a centralized Trusted Time Server. In this case, the clients 320, 322, . . . , 328 are time-synchronized prior to the transaction using a distributed protocol such as a Network Time Protocol service. It is also preferred that the construction of the clients 320, 322, . . . , 328 is made tamper proof, e.g., by using dedicated hardware. Apart from the method for generating the time stamps that are included in the Response Tokens, the remainder of the above described method (and its alternative embodiments) may be used to ensure synchronicity of the actions of multiple parties.

Figure 7:
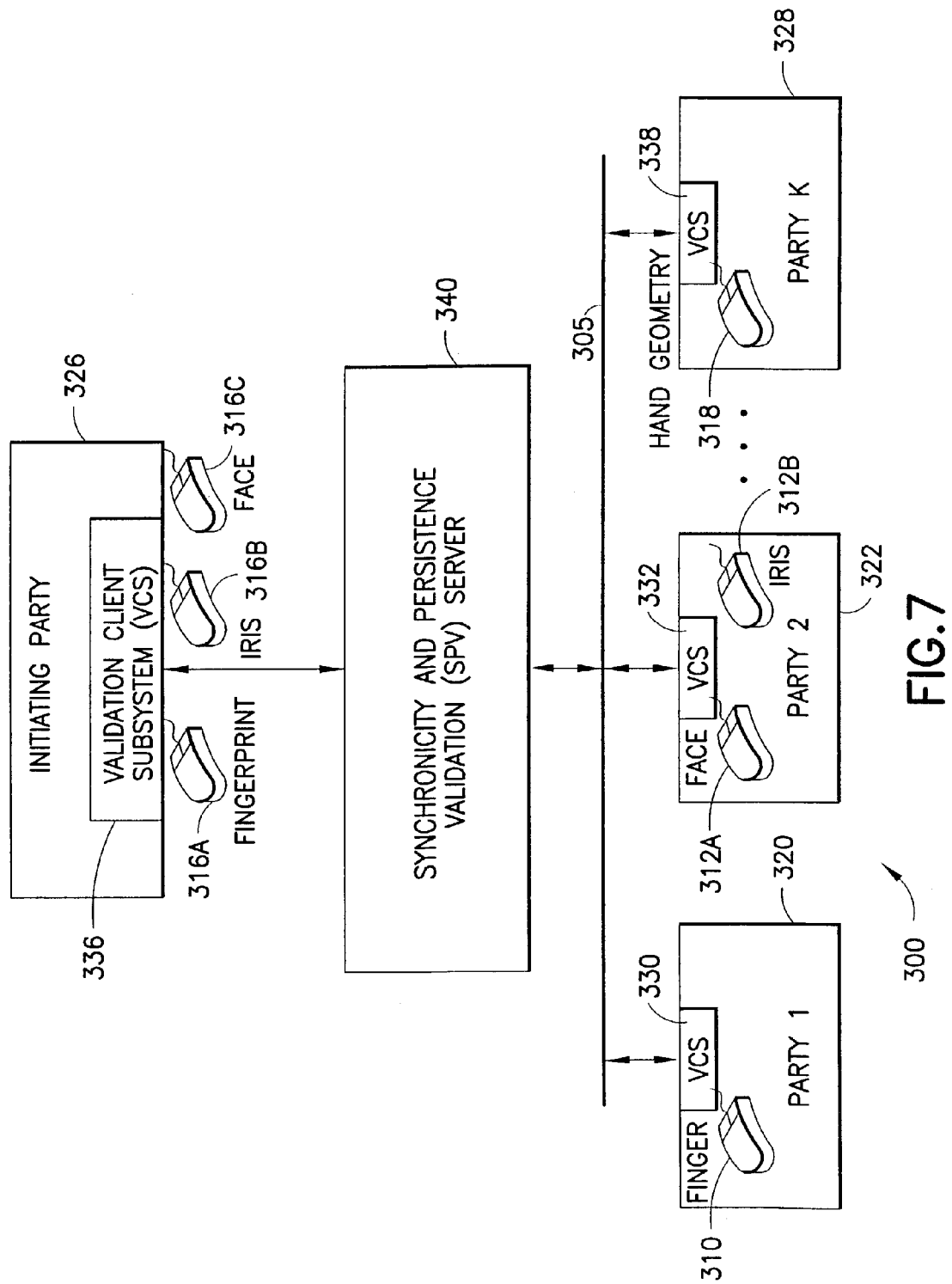
FIG. 7 is a flow chart of an optional alternative persistent verification process that tests more than one biometric per client and/or different biometrics per client.

FIG. 7 is a logic flow diagram that illustrates a case of more than one biometrics/client, and different biometrics for different clients. Referring to FIG. 7, persistence may be implemented by a variant of the above protocol. In a first embodiment, the SPV Server 340 continually generates UTTs, and continually evaluates RTs received from the clients 320, 322, . . . , 328. Note in FIG. 7 that certain of the clients have more than one biometric input device, e.g., client 322 includes a face biometric input device 312A and an iris biometric input device 312B. If the sequence of RTs from each client 320, 322, . . . , 328 meets certain specifications (optionally controlled by the policy coordinator 342), such as a minimum threshold between RT time stamps, the transaction is deemed to be persistent for that client. An intersection of persistence intervals between multiple participating clients 320, 322, . . . , 328 is then employed to certify the synchronicity and persistence of the multiparty transaction.

Other embodiments of the persistence protocol may use simpler RTs in which the process of acquiring a biometric ensures the continuity of the transaction. In this case freshly generated SPV server 340 time stamps need not be included in the RTs.

Figure 8:
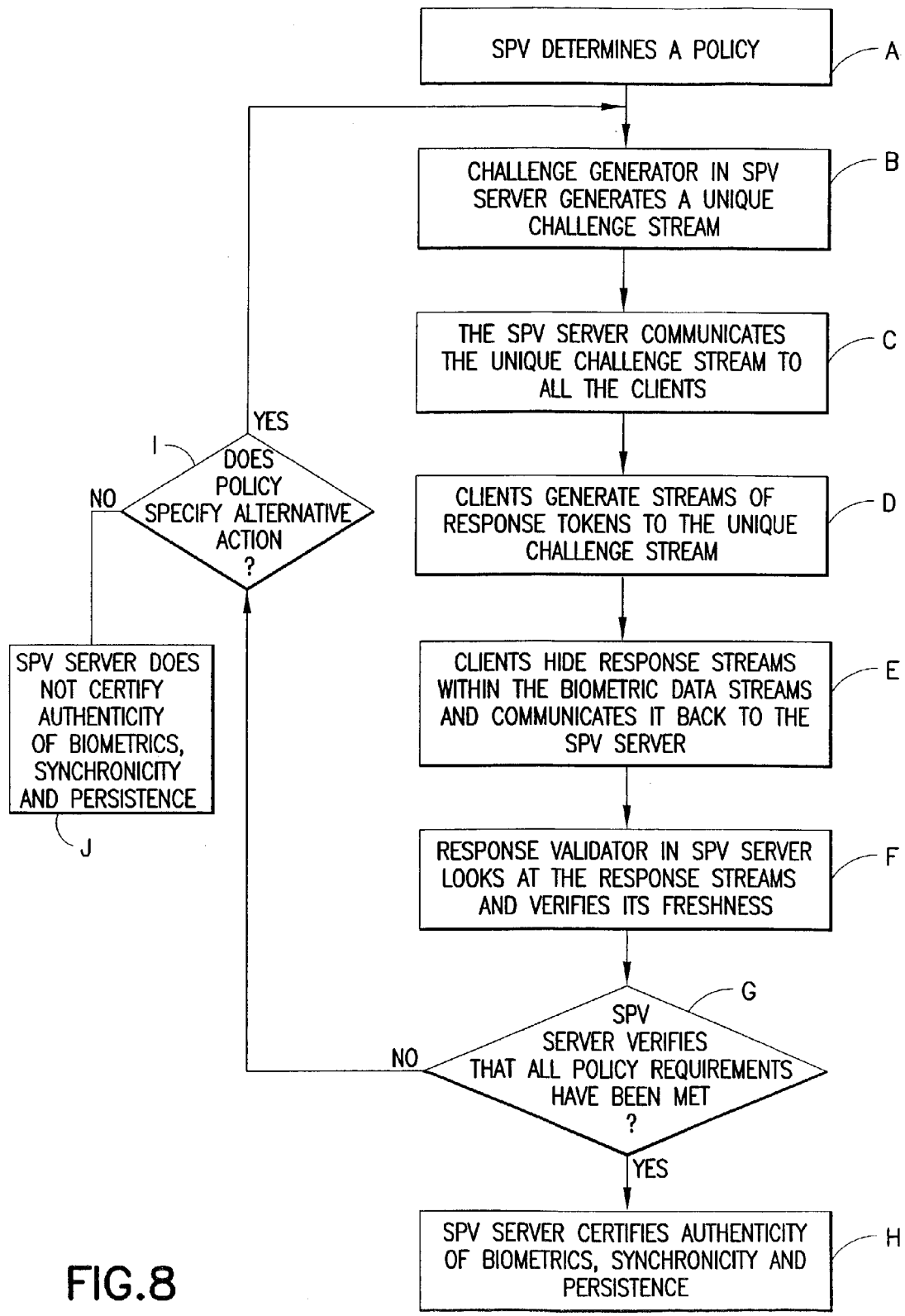
FIG. 8 is a flow chart of an optional persistence verification process.

FIG. 8 is a logic flow diagram that illustrates server certification of authenticity of the biometrics, and their synchronicity, and persistence. At Block A the SPV server 340 determines a policy. At Block B the challenge generator 344 generates a unique challenge steam. The SPV server 340 communicates the unique challenge stream to all of the clients 320,322, . . . ,328 at Block C. At Block D each of the clients 320, 322, . . . , 328 generate streams of response tokens to the unique challenge stream, and the streams of biometric response tokens are sent back to the SPV server 340 at Block E. The biometrics signals may be generated, as in FIG. 7, using different biometric input devices, and multiple input devices may be used at all or some of the clients 320, 322, . . . , 328. For example, client 322 generates streams of face and iris biometrics signals obtained from face and iris input devices 312A and 312B, respectively. In the preferred embodiment the clients 320,322, . . . , 328 hide the response streams within the biometric data streams, such as by using steganographic techniques. At Block F the response validator of the SPV server 340 examines the response streams and verifies the "freshness" or timeliness of the response streams. At Block G the SPV server 340 verifies, in cooperation with the policy coordinator 342, whether all of the policy requirements have been met (e.g., regarding persistence of the parties involved in the transaction). If not, control passes to Block I to determine if the policy in effect specifies an alternate action and, if it does not, control passes to Block J where the SPV server 340 does not certify the authenticity of the biometrics, the synchronicity and persistence of the response stream or streams. If the policy does specify an alternate action at Block I, control returns to Block B to continue the transaction. If at Block G the SPV server 340 does verify that all of the policy requirements have been met, control passes to Block H where the SPV server 340 certifies the authenticity of the biometrics, as well as the synchronicity and persistence of the multi-party transaction, as specified by the applicable policy. As for the continuity case described above, the SPV server 340 may identify and report the identities of the subset of participants that performed the transaction with the desired persistence.

Figure 9:
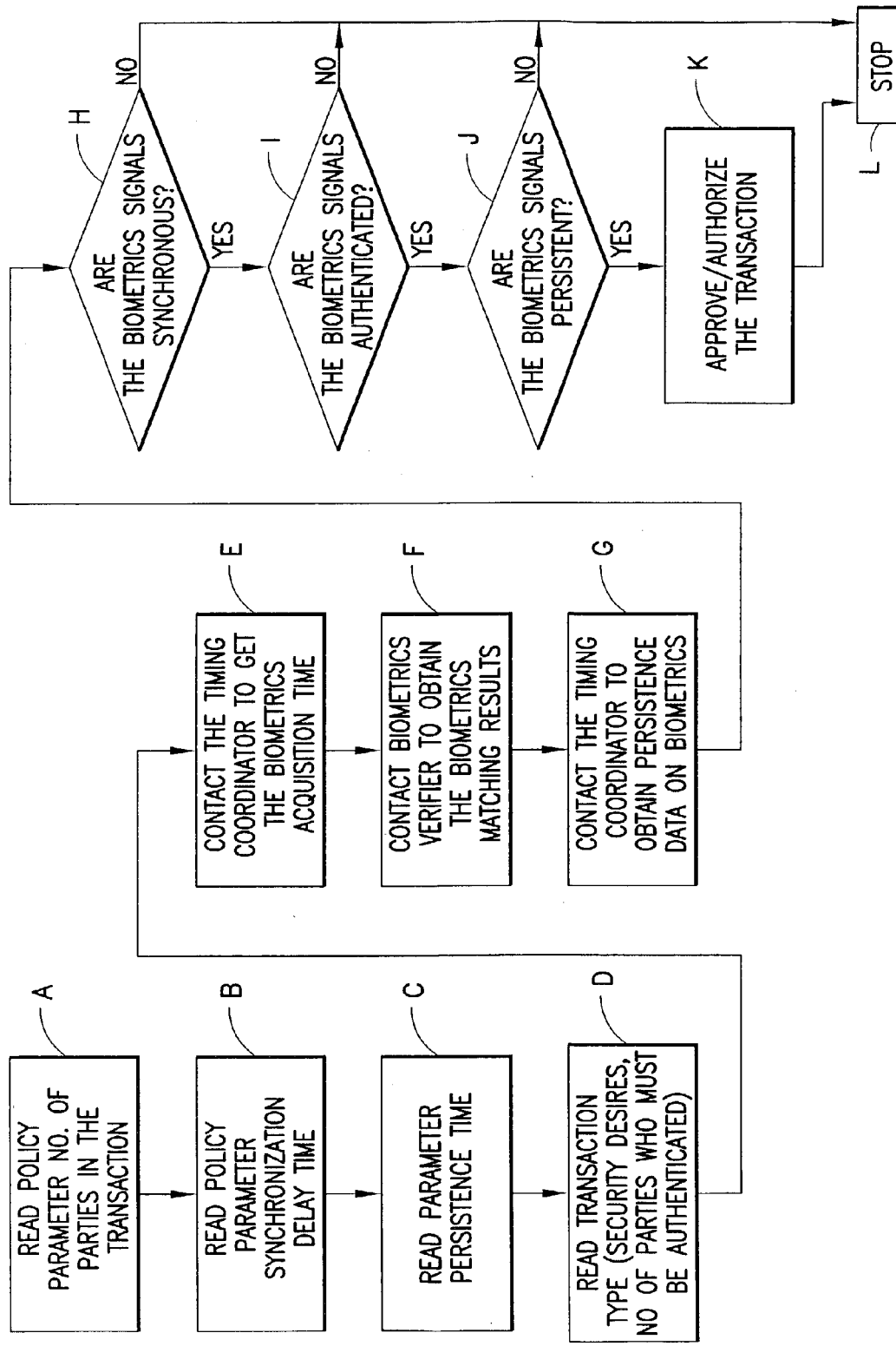
FIG. 9 is a flow chart of a policy coordinator.

FIG. 9 is a flow chart describing the operation of the policy coordinator 342. At Block A the policy coordinator 342 reads the policy parameters numbers of the parties to a transaction, and at Block B reads the parameters synchronization delay time. At Block C the policy coordinator determines parameter persistence time. At Block D transaction type is determined, such as level of security desired, and the number of parties who must be authenticated during the transaction. At Block E the timing coordinator 346 is contacted to obtain the biometrics acquisition time, and at Block F the biometrics processor 348 is contacted to determine the biometrics matching results. Having obtained the biometrics matching results, the timing coordinator is again contacted at Block G to obtain the biometrics-related persistence data. Having thus obtained this information, at Blocks H, I and J tests are made to determine if the biometrics signals are synchronous to one another, whether the biometrics signals are authenticated (verified by the biometrics processor 348), and whether the biometrics signals are persistent (as defined by the policy at Block C). If the results of any of these tests is negative the transaction fails, and control passes to Block L, otherwise if all of the tests are affirmative control passes to Block K to approve or authorize the transaction.

An (XML) example of a policy used by the policy coordinator 342 follows. Note that in this example the policy defines acceptable authentication methods for both the initiator, the respondent and the witness, defines the minimum and maximum values for both synchronicity (e.g., minimum 0.05 millisecond) and persistence (e.g., minimum 0.1 millisecond), as well as the action type (e.g.,

```
<policy>
    <condition>
        <condition-type = required/>
        <participant-type = initiator/>
        <acceptable-authentication-methods>
            fingerprint
                facial-video-stream
                retinal-scan
        </acceptable-authentication-methods>
    </condition>
    <condition>
        <condition-type = required/>
        <participant-type = respondent/>
        <acceptable-authentication-methods>
            fingerprint
                retinal-scan
        </acceptable-authentication-methods>
    </condition>
    <condition>
        <condition-type = optional/>
        <participant-type = witness/>
        <acceptable-authentication-methods>
            fingerprint
                retinal-scan
        </acceptable-authentication-methods>
    </condition>
    <condition>
        <synchronicity>
            minimum = 0.05 millisecond
                maximum = indefinite
        </synchronicity>
        <persistence>
            minimum = 0.1 millisecond
                maximum = indefinite
        </persistence>
    </condition>
    <action>
        generate validity-certificate
    </action>
</policy>
```

Figure 10:
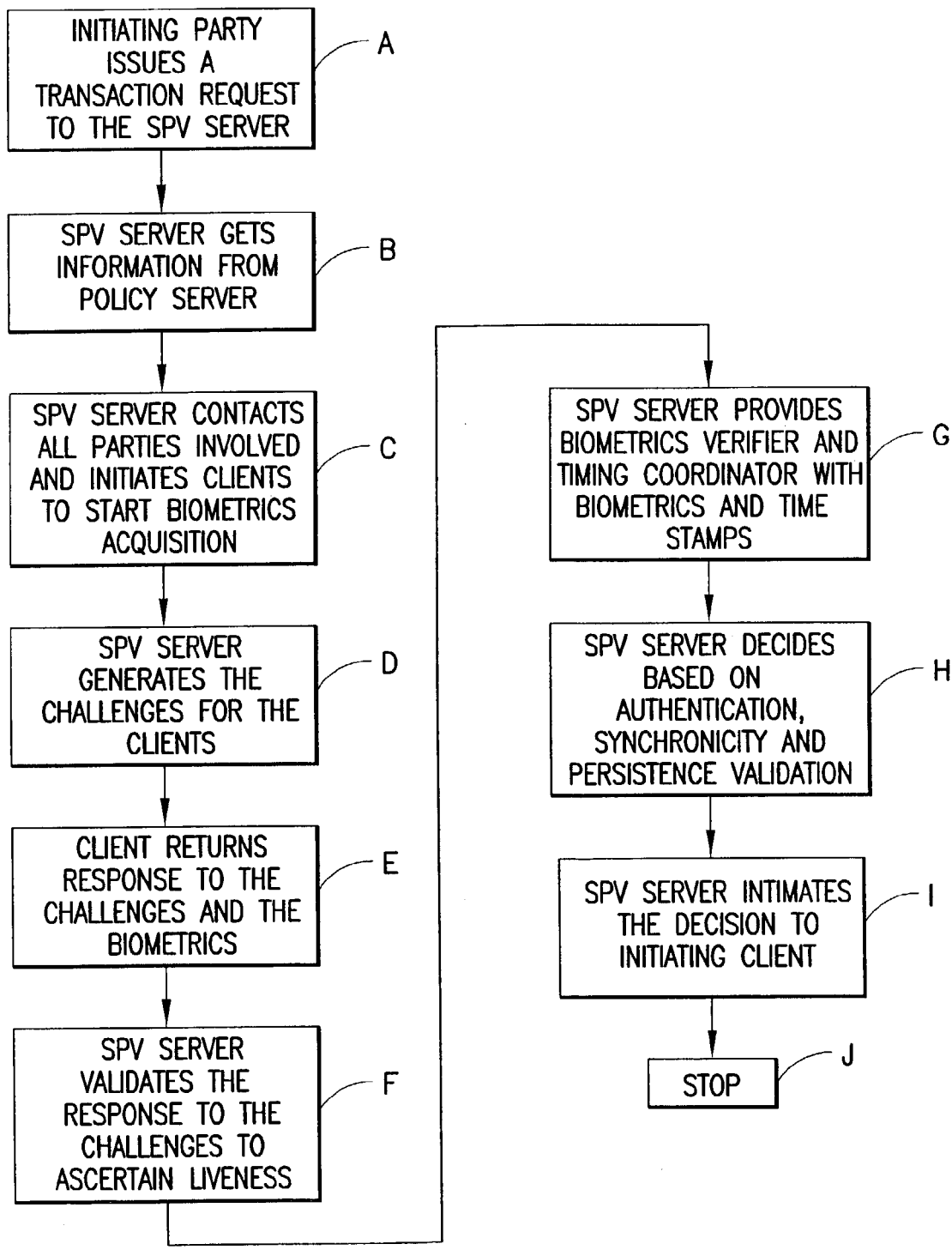
FIG. 10 is a flow chart of a client process (biometric acquisition, challenge response, and optional liveness detection).

FIG. 10 is a flow chart showing the overall flow of biometric acquisition, challenge response, and optional liveness detection for a client process. At Block A the initiating party 326 issues a transaction request to the SPV server 340. At Block B the SPV server 340 obtains the policy information from the policy coordinator 342, and at Block C contacts the all client parties involved in the transaction and requests the participating clients 320, 322, . . . , 328 to begin acquiring biometrics information using the biometric input devices 310, 312, . . . , 318. At Block D the SPV server 340 generates challenges using the challenge generator 344, and transmits the generated challenges to the participating clients 320, 322, . . . , 328. At Block E the participating clients 320, 322, . . . , 328 return responses to the challenges. In the preferred embodiment, the client responses are inserted steganographically into the compressed video stream that conveys the biometrics signals generated from the biometric input devices 310, 312, . . . , 318, as described in greater detail below in reference to FIG. 11. At Block F the SPV server 340 extracts the responses from the compressed video streams, preferably by using the reverse procedure to the procedure used by the clients 320, 322, . . . , 328 to steganographically insert the responses into the video stream (described in reference to FIG. 11), and then validates the responses to the challenges to ascertain the liveliness or timeliness of the responses from the various participating clients 320, 322, . . . , 328. Assuming that the responses are received by the SPV server 340 in a timely manner, as possibly defined by the policy currently in effect, the SPV server at Block G provides the received biometrics signals to the biometrics processor 348 and received time stamps to the timing coordinator 346. The SPV server 340 then validates at Block H, based on the presence or absence of authentication outputs from the biometrics processor 348 and the timing coordinator 346, the synchronicity and persistence of the responses, as specified by the policy that is currently in effect. The final decision with respect to authentication of the parties to the transaction is then passed to the initiating client 346 at Block I, and the method terminates at Block J.

It should be appreciated that a number of such transactions can concurrently be running, with the SPV server 340 managing the authentication of all of them. Note as well that a given one of the clients 320, 322, . . . , 328 could at any given time be a party to more than one transaction.

As has been mentioned, a video compression-based data concealment technique may be employed for the clients 320, 322, . . . , 328 to conceal their response(s) in the biometrics video signal. MPEG-like video compression is used to illustrate the operation of this embodiment, although the teachings of this invention are not limited to the use of MPEG compressed video streams.

As was noted above, in the presently preferred embodiment the client responses are inserted steganographically into the compressed video stream, such as the exemplary MPEG formatted video stream. The MPEG video format contains of frames in video sequences coded as one of the basic types, i.e., I, P, and B frames. The I frames (Intra-coded) and contain no motion information. The P frames (Predicted from past I or P frames) contain forward predicted motion vectors (FPMVs). The B frames (Predicted from past/future I or P frames) contain forward and backward PMVs. In the presently preferred embodiment the I frames are used to conceal the client's response to the challenge as follows.

Figure 11:
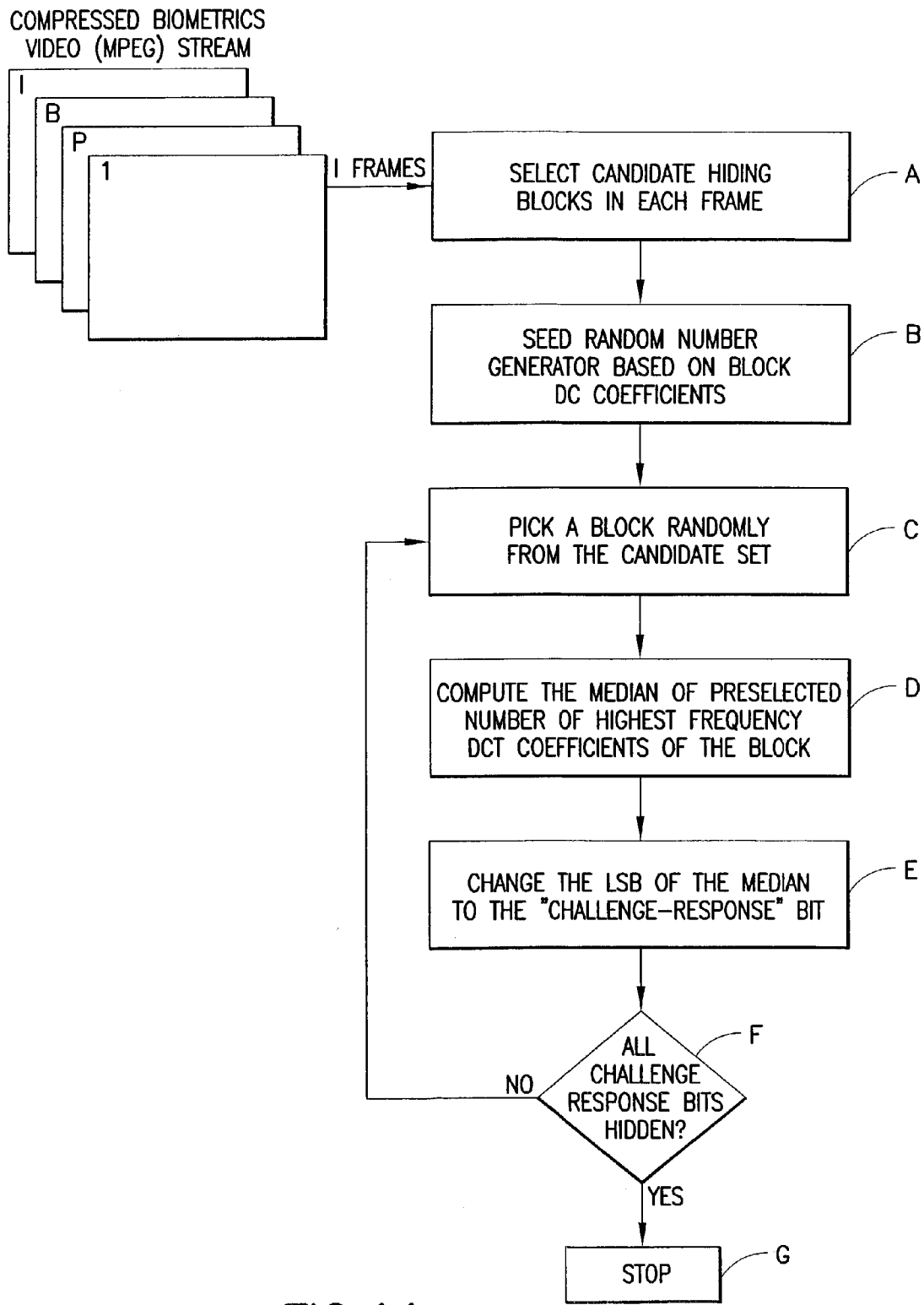
FIG. 11 is a flow chart of challenge response concealed in a biometric video stream.
Figure 12:
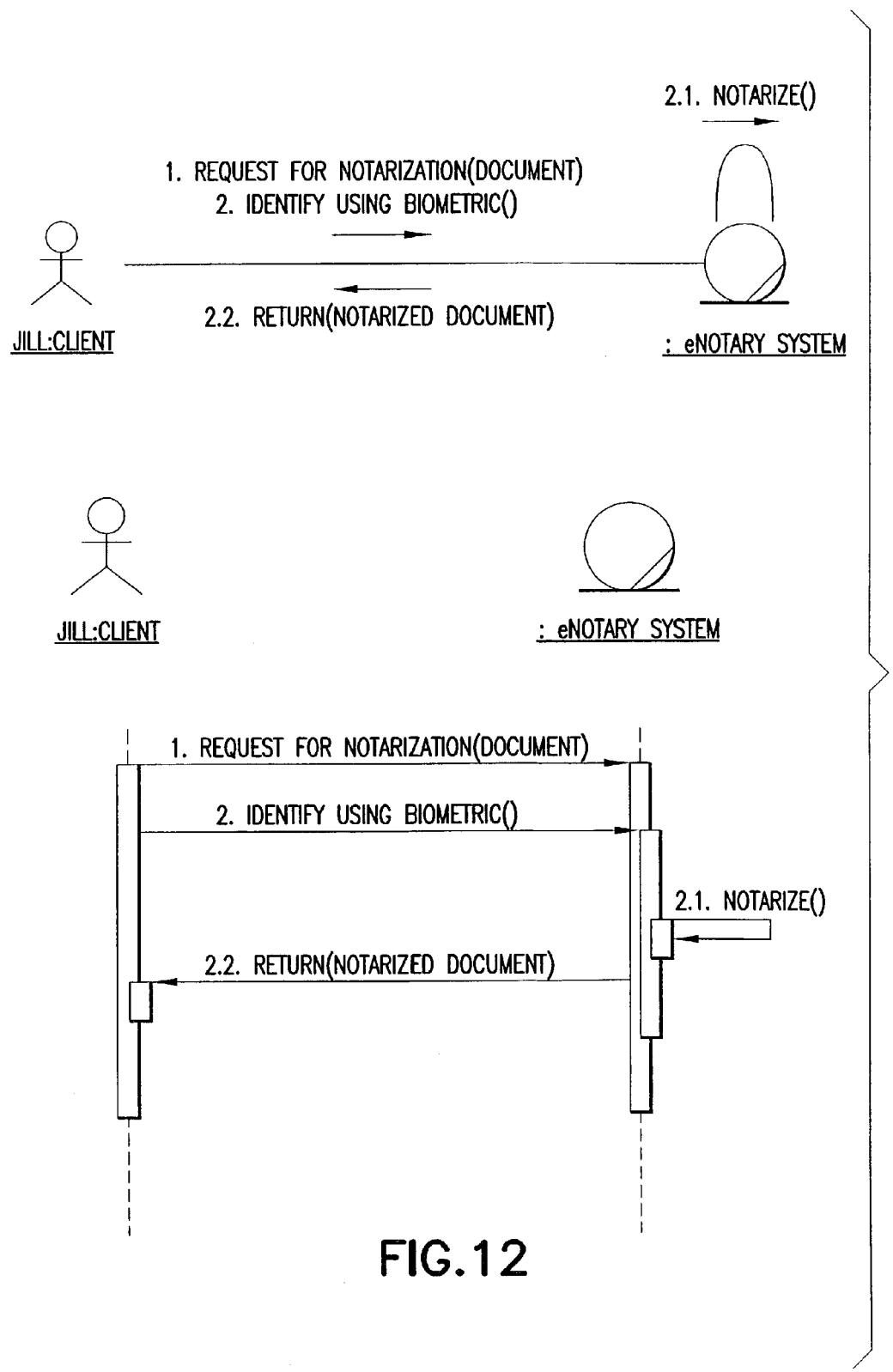
FIGS. 12 through 20 show various exemplary application scenarios for the multi-party authentication process in accordance with embodiments of this invention.
Figure 13:
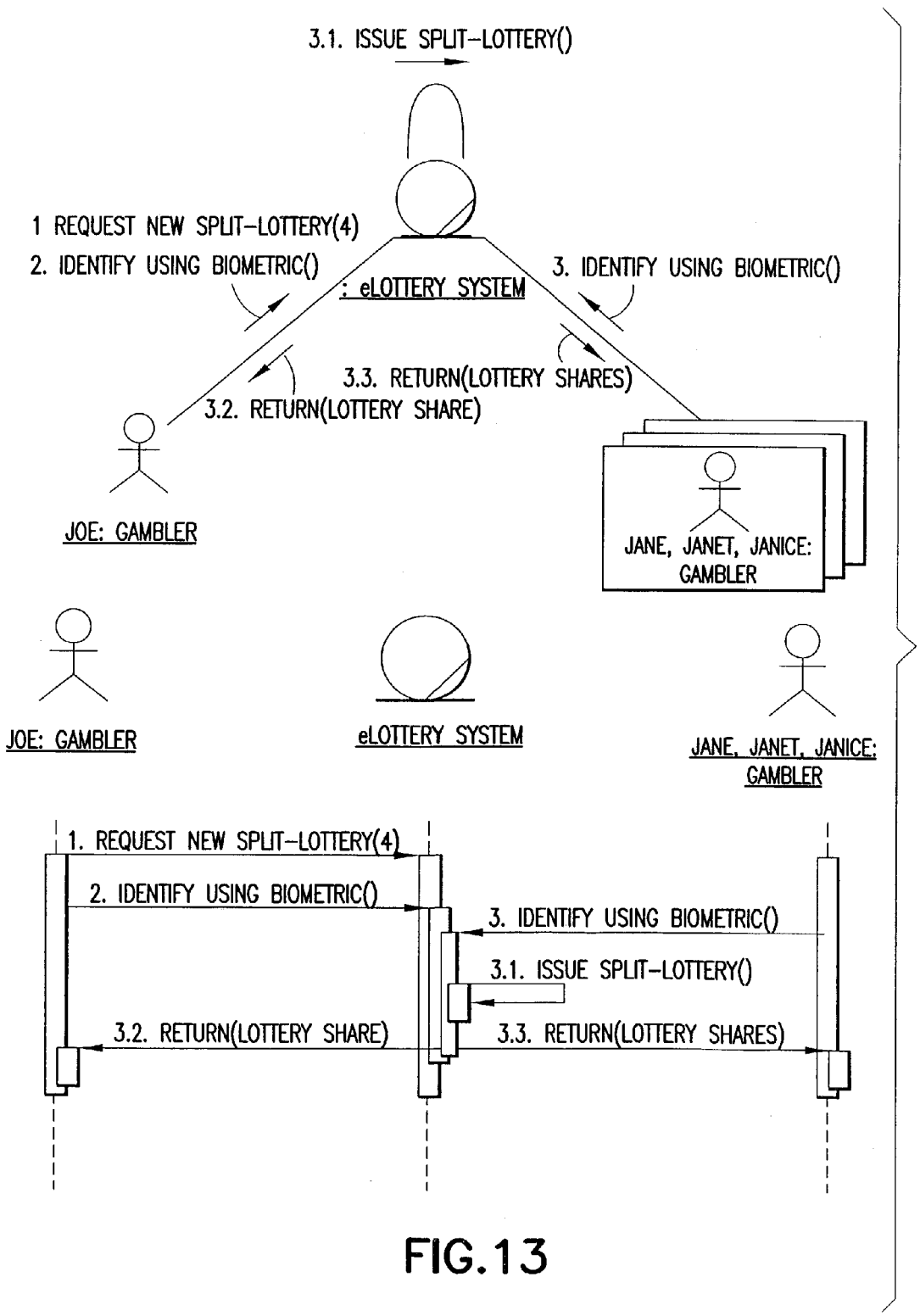
Figure 14B:
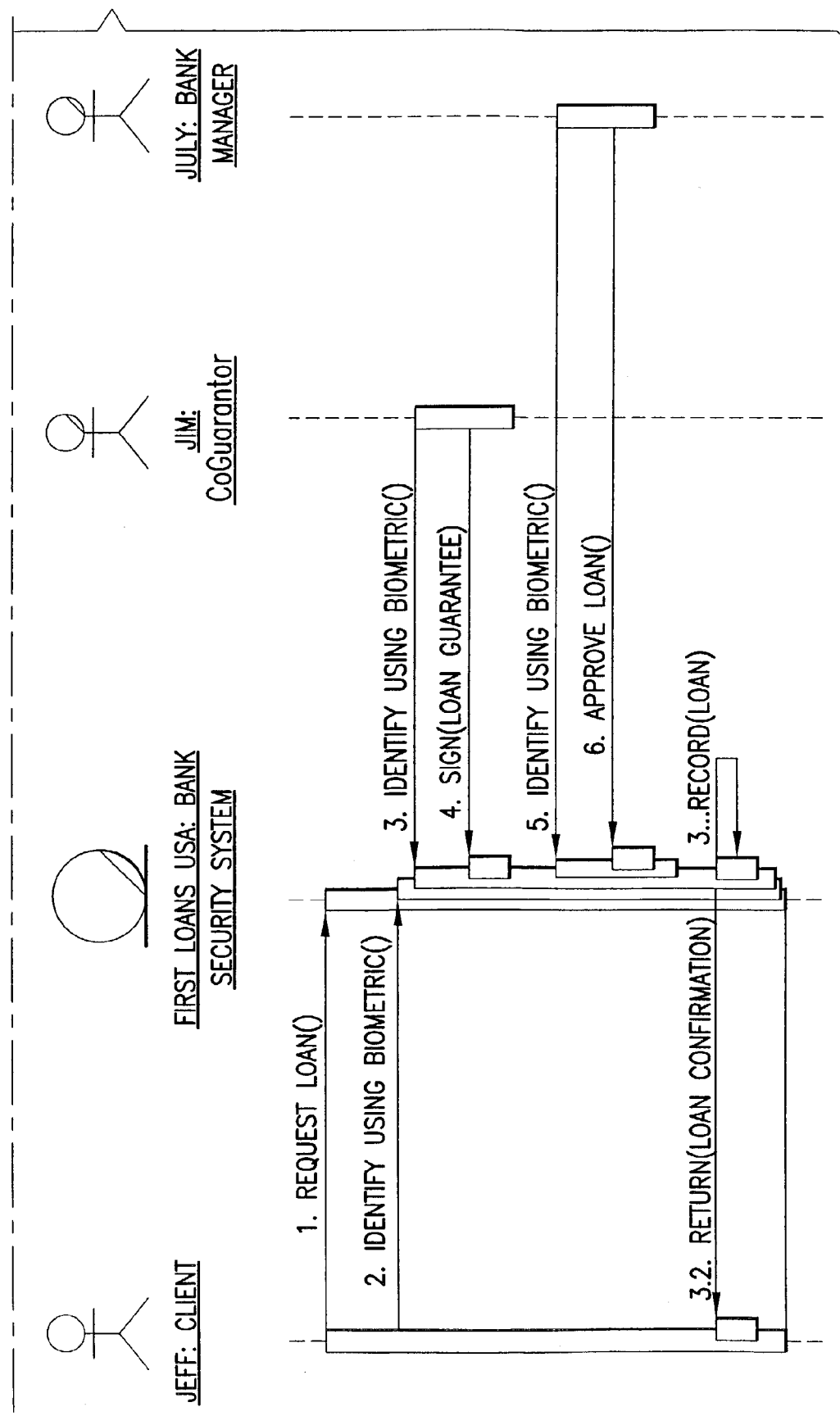
Figure 15B:
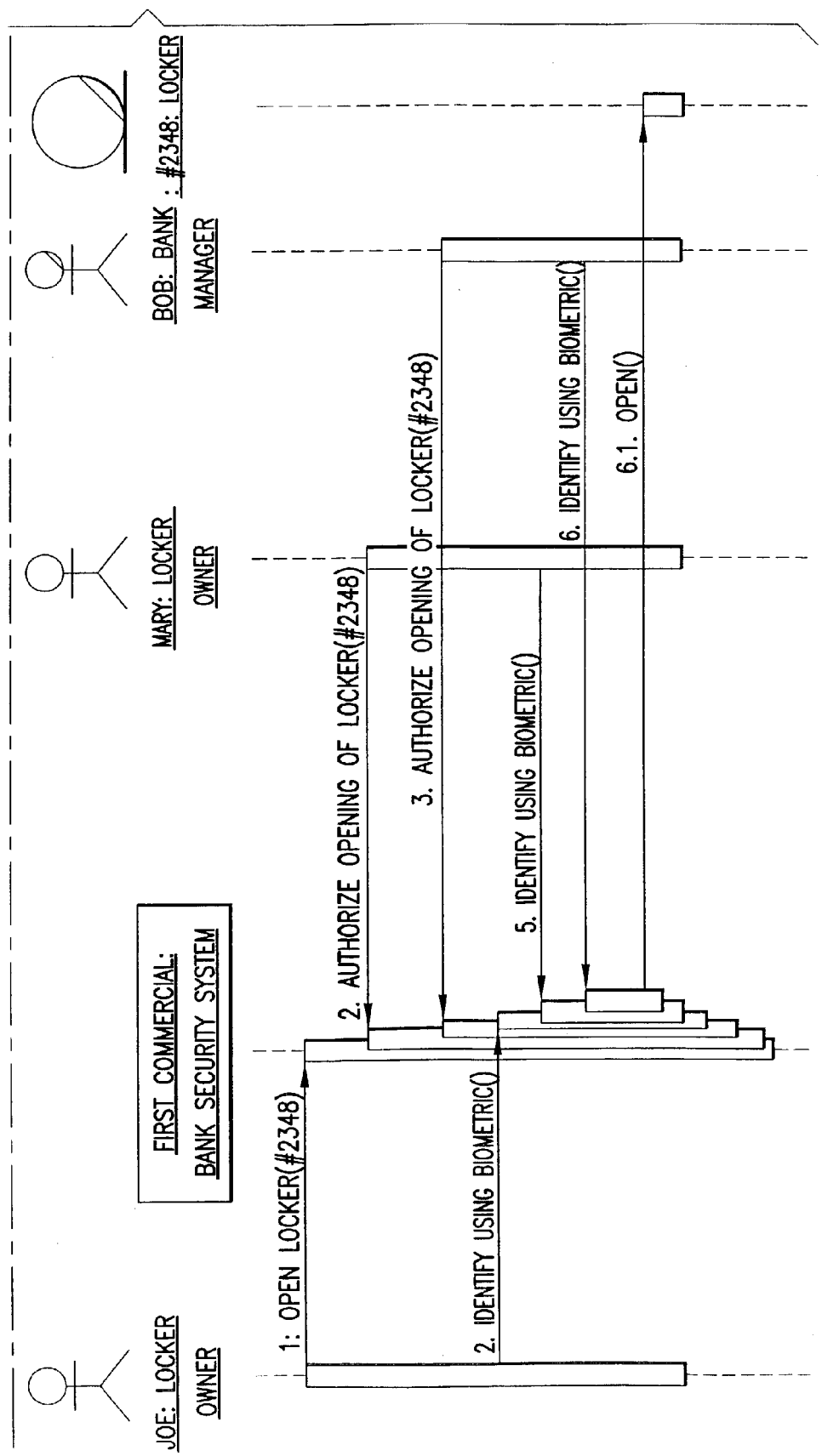
Figure 16:
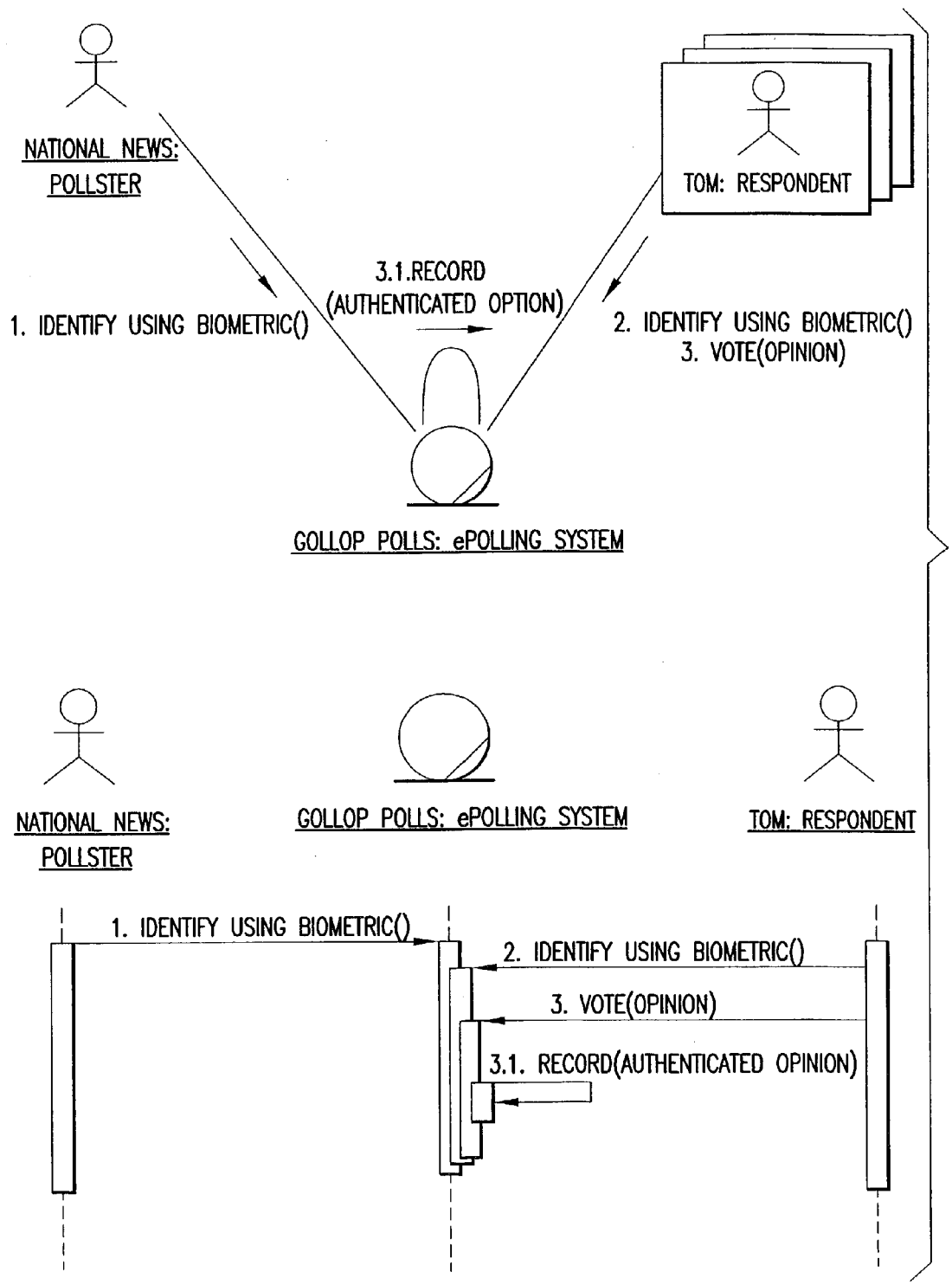
Figure 17:
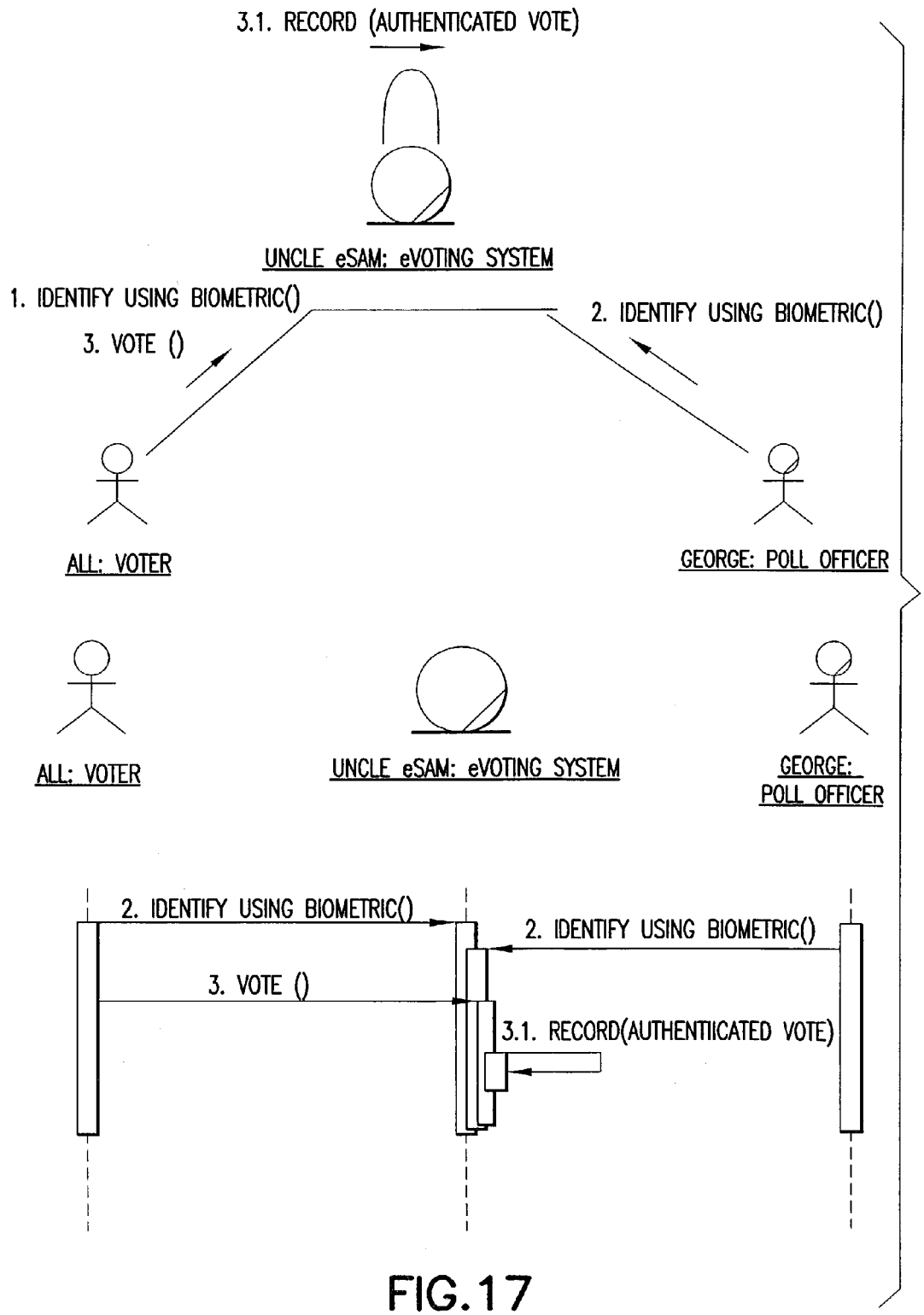
Figure 18:
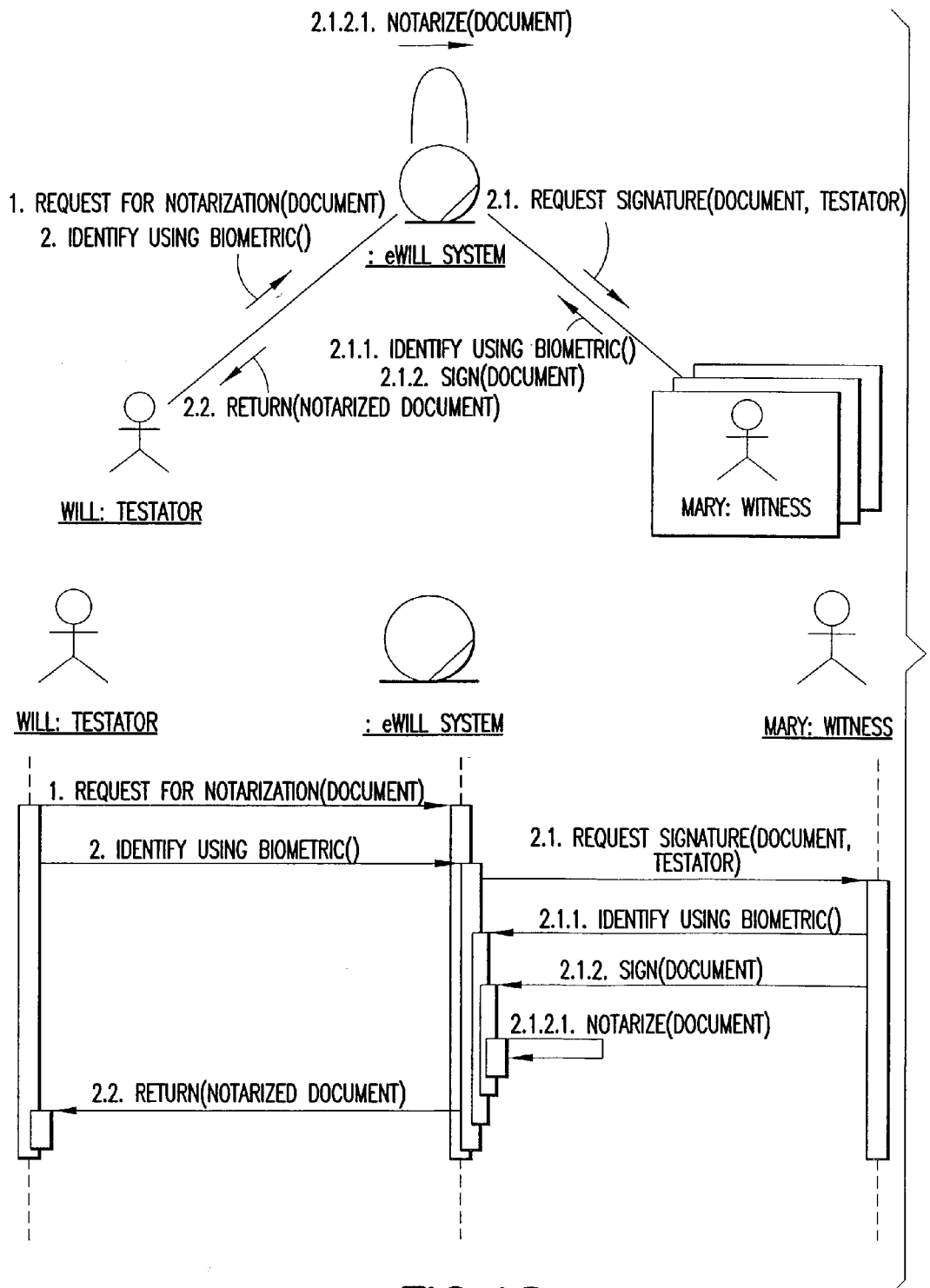
Figure 19B:
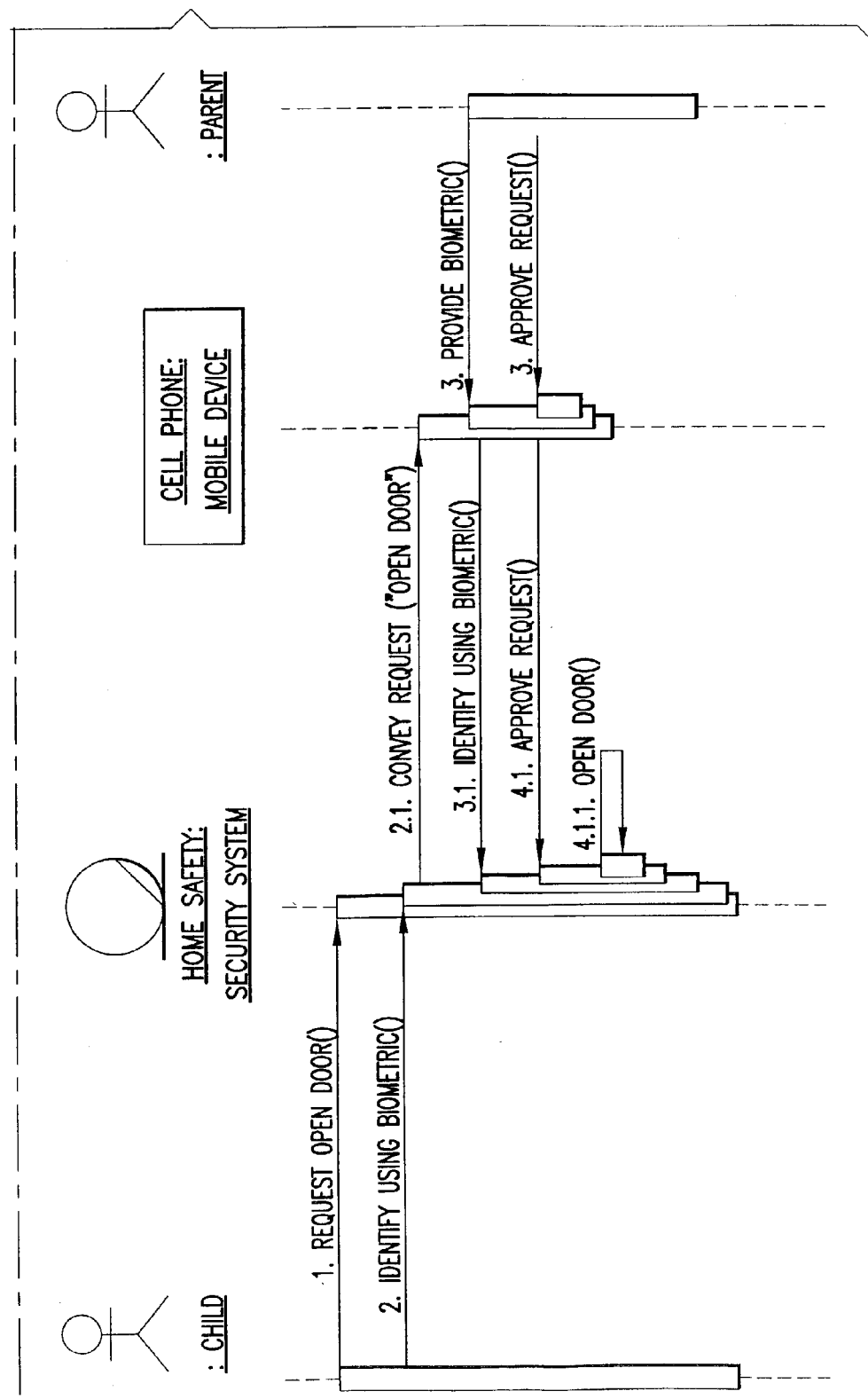

Referring to FIG. 11, the response concealment process first involves site selection, where for every block of 8×8 pixels, the method selects the nine highest frequency Discrete Cosine Transform (DCT) coefficients (quantized); computes the variance of these nine values; and if the variance is sufficiently low, mark this block of pixels as a candidate block in which to embed information (Block A). Next the process seeds a random number generator (which can be a pseudo-random number generator) based on the sum of the DCT coefficients of the blocks in the frame (Block B), followed at Block C by selecting a candidate block from the site set randomly based on the seed computed in Block B. The process then modifies the least significant bit of the median of nine values to be the response message bit (Blocks D and E). At Block F a test is made to determine if all of the challenge response bits are concealed. If they are not all concealed the process flow returns to Block C to select another candidate block of pixels, otherwise the flow proceeds to Block G to terminate the concealment of the challenge response bits in the compressed biometrics video stream.

In this embodiment then a client computer 320, 322, . . . , 328 contains or has access to an image compressor that spatially compresses an image to create a spatially compressed image with a plurality of frequency components, each with a respective spatial frequency and a respective amplitude. A candidate data site selector then provides a selected set of a plurality of the frequency components, where the selected set has frequency components with high spatial frequencies and large amplitudes. The data site selector may use a random process to randomly select from the selected sites to create a site set. A site modifier partitions the information sequence into one or more portions and uses one or more of the portions to modify one of the amplitudes of one of the frequency components in the site set, thereby concealing the response to the challenge within the spatially compressed image.

Correspondingly, the SPV server 340 includes an image decompressor that at least partially decompresses the image to create a plurality of frequency components, each with a respective spatial frequency and a respective amplitude; a candidate selector that selects a selected set of a plurality of the frequency components, the selected set having the frequency components with high spatial frequencies and large amplitudes; a data site selector that uses a random process to randomly select from the selected set to create a site set; and a message extractor that uses one of the amplitudes of one of the frequency components in the site set to extract one or more portions of the response to the challenge.

Several application scenarios for the multi-party authentication process described above are detailed in FIGS. 12–20. Each of these Figures illustrates a scenario using two diagrams. The first diagram identifies the actors (denoted by stick figures) and systems (denoted by other symbols) involved in the scenario, and the numbered arrows represent the sequence and directionality of interactions between the actors and the systems. The second diagram more clearly portrays the time sequence of interactions in the same scenario by plotting the interactions vertically in chronological order; where each vertical column represents a timeline for the actor or system drawn at the head of the column.

Figure 20:
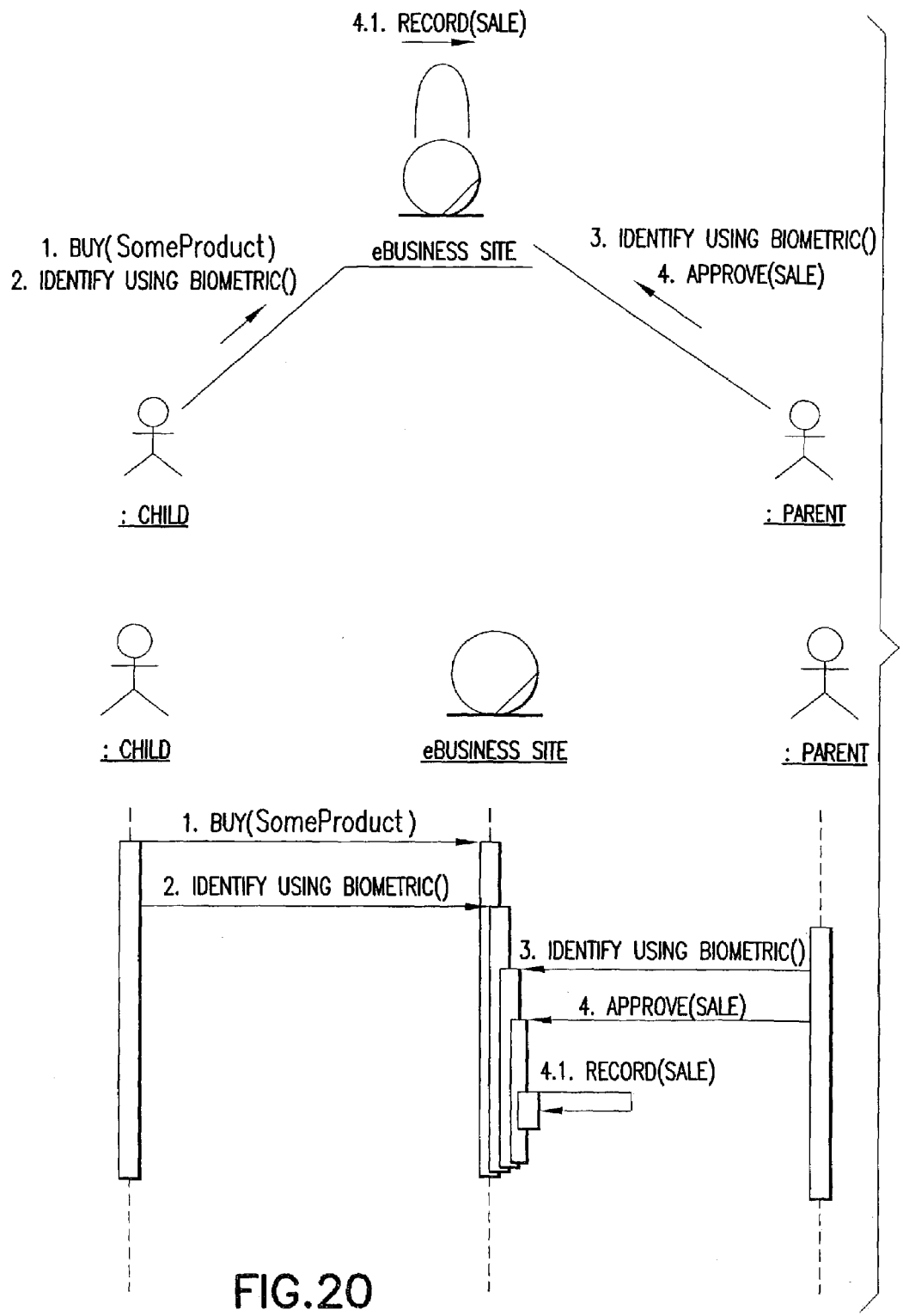

These exemplary application scenarios include: a request to notarize an electronic document (FIG. 12); a request by two gamblers to issue a split winning in an electronic lottery (eLottery) system (FIG. 13); a request for a loan involving a requestor client, a co-guarantor client and a bank manager client (FIG. 14); a request to open a bank locker (e.g., a safety deposit box) that is co-owned by two clients, and that requires the participation of a bank manager client (FIG. 15); an electronic polling (ePolling) application involving a pollster client and a respondent client (FIG. 16); an electronic voting (eVoting) application requiring the participation of a voter client and a poll officer client (FIG. 17); an electronic will (eWill) application that requires the participation of a testator client and a witness client (FIG. 18); an example of the above-mentioned door opening application mediated through a wireless mobile communications device (e.g., a cellular telephone) involving a child client and a parent client (FIG. 19); and an electronic business (eBusiness) application involving the participation of a purchaser client (a minor child client in this example) and a purchase approval client (a parent in this case), as shown in FIG. 20.

All of these non-limiting examples of application scenarios involve the client hardware and software, the network 305, and the SPV server hardware and software as illustrated and described with reference to FIGS. 3–11.

It should thus also be appreciated that an aspect of this invention is a computer readable computer program carrier, such as a fixed or removable magnetic or optical disk, where execution of one or more computer programs by at least one computer occurs during a multi-party electronic transaction. The computer program, that may actually be partitioned into a plurality of computer programs for execution at the client computers 320, 322, . . . , 328 and the SPV server 340, causes, in response to the initiating party at one client computer 326, an initiation of the multi-party transaction by sending a request to the transaction management server (SPV server 340). The computer program causes the transaction management server, based on a policy defined for the transaction, to contact at least one other client computer associated with at least one other party to the transaction for requesting the parties to provide biometrics signals, and also causes the SPV server 340 to generate a challenge to all parties to the transaction. In response to receiving the challenge at the client computers 320, 322, . . . , 328 the computer program causes the client computers to insert a response to the challenge into provided biometrics signals, and further causes the SPV server 340 to separate the challenge responses from the biometrics signals and to verify temporal synchronicity and persistence of biometrics signals acquisition as specified by the policy. If the verification is successful, SPV server 340 certifies the authenticity of the parties to the multi-party electronic transaction requested by the initiating party 326. In a preferred but non-limiting embodiment the provided biometrics signals comprise compressed video signals having steganographically inserted challenge response data.

While described in the context of a number of presently preferred embodiments, those skilled in the art should recognize that various modifications to these embodiments can be made, such as by re-arranging the order of certain of the blocks of the logic flow diagrams, and/or by providing different types of biometrics input devices (e.g., transmitting digital audio (compressed or not) derived from a person's speech using a suitable audio transducer, and concealing client challenge response data in the digital audio data), and that all such modifications will still fall within the scope of this invention.

What is claimed is:

1. A computer system for conducting a multi-party electronic transaction, comprising:
   circuitry for initiating a multi-party transaction with a party at a client computer by sending a request to a transaction management server;
   circuitry, responsive to a policy defined for the transaction, for contacting at least one other client computer associated with at least one other party to the transaction and requesting the parties to provide biometrics signals;
   a challenge generator for generating a challenge to all parties to the transaction;
   circuitry for receiving the challenge at the client computers and for combining, at each client computer, provided biometrics signals with challenge response data; and
   circuitry for separating the challenge response data from the biometrics signals at the transaction management server, for verifying temporal synchronicity and persistence of biometrics signals acquisition between the multiple participating parties as specified by the policy and, if the verification is successful, for certifying the authenticity of the parties to the multi-party electronic transaction requested by the initiating party.

2. A computer system as in claim 1, where provided biometrics signals comprise audio signals representing a voice of a party to the transaction.

3. A computer system as in claim 1, where provided biometrics signals comprise image signals representing a fingerprint of a party to the transaction.

4. A computer system as in claim 1, where provided, biometrics signals comprise image signals representing a face of a party to the transaction.

5. A computer system as in claim 1, where provided biometrics signals comprise image signals representing a feature of the eye of a party to the transaction.

6. A computer system as in claim 1, where provided biometrics signals comprise image signals representing the hand geometry of a party to the transaction.

7. A computer system as in claim 1, where provided biometrics signals comprise compressed signals.

8. A computer system as in claim 1, where provided biometrics signals comprise compressed video signals having steganographically inserted challenge response data.

9. A computer system as in claim 1, where the circuitry that combines provided biometrics signals with a challenge response data compresses a generated image to create a compressed image with a plurality of frequency components, each with a respective spatial frequency and a respective amplitude; selects a selected set of a plurality of the frequency components having high spatial frequencies and large amplitudes; randomly selects from the selected set to create a site set; and partitions an information sequence into one or more portions and using one or more of the portions to modify one of the amplitudes of one of the frequency components in the site set so that the challenge response data is inserted steganographically into compressed image data that is transmitted to the network.

10. A computer system as in claim 9, where the circuitry for separating decompresses the compressed image data to create a plurality of frequency components, each with a respective spatial frequency and a respective amplitude; selects a set comprised of a plurality of the frequency components, the selected set having the frequency components with high spatial frequencies and large amplitudes; randomly selects from the selected set to create a site set; and extracts, using one of the amplitudes of one of the frequency components in the site set, one or more portions of the challenge response data.

11. A computer system as in claim 1, where the temporal synchronicity and persistence verification of biometrics signals comprises at least one of identifying, verifying and authenticating biometrics of at least two persons simultaneously.

12. A computer system as in claim 1, where the temporal synchronicity and persistence verification of biometrics signals comprises at least one of identifying, verifying and authenticating biometrics of at least two persons within a prescribed time period.

13. A computer system as in claim 1, where the temporal synchronicity and persistence verification of biometrics signals comprises at least one of identifying, verifying and authenticating biometrics of at least two persons that are sampled within a time period.

14. A computer system as in claim 1, where the temporal synchronicity and persistence verification of biometrics signals comprises at least one of identifying, verifying and authenticating biometrics of at least two persons continuously within a time period.

15. A computer executed method for use in conducting a multi-party electronic transaction, comprising:
- initiating a multi-party transaction with a party at a client computer by sending a request to a transaction management server;
- based on a policy defined for the transaction, contacting at least one other client computer associated with at least one other party to the transaction and requesting the parties to provide biometrics signals;
- generating a challenge to all parties to the transaction;
- receiving the challenge at the client computers and combining, at each client computer, provided biometrics signals with challenge response data;
- separating the challenge response data from the biometrics signals at the transaction management server and verifying temporal synchronicity and persistence of biometrics signals acquisition between the multiple participating parties as specified by the policy; and
- if the verification is successful, certifying the authenticity of the parties to the multi-party electronic transaction requested by the initiating party.

16. A method as in claim 15, where provided biometrics signals comprise audio signals representing a voice of a party to the transaction.

17. A method as in claim 15, where provided biometrics signals comprise image signals representing a fingerprint of a party to the transaction.

18. A method as in claim 15, where provided biometrics signals comprise image signals representing a face of a party to the transaction.

19. A method as in claim 15, where provided biometrics signals comprise image signals representing a feature of the eye of a party to the transaction.

20. A method as in claim 15, where provided biometrics signals comprise image signals representing the hand geometry of a party to the transaction.

21. A method as in claim 15, where provided biometrics signals comprise compressed signals.

22. A method as in claim 15, where provided biometrics signals comprise compressed video signals having steganographically inserted challenge response data.

23. A method as in claim 15, where combining provided biometrics signals with a challenge response data comprises compressing a generated image to create a compressed image with a plurality of frequency components, each with a respective spatial frequency and a respective amplitude; selecting a selected set of a plurality of the frequency components having high spatial frequencies and large amplitudes; randomly selecting from the selected set to create a site set; and partitioning an information sequence into one or more portions and using one or more of the portions to modify one of the amplitudes of one of the frequency components in the site set so that challenge response data is inserted steganographically into compressed image data that is transmitted to the network.

24. A method as in claim 23, where separating comprises decompressing the compressed image data to create a plurality of frequency components each with a respective spatial frequency and a respective amplitude; selecting a set comprised of a plurality of the frequency components, the selected set having the frequency components with high spatial frequencies and large amplitudes; randomly selecting from the selected set to create a site set; and extracting, using one of the amplitudes of one of the frequency components in the site set, one or more portions of the challenge response data.

25. A method as in claim 15, where said electronic transaction comprises notarization of an electronic document.

26. A method as in claim 15, where said electronic transaction comprises a wagering transaction.

27. A method as in claim 15, where said electronic transaction comprises a lottery transaction.

28. A method as in claim 15, where said electronic transaction comprises a loan request and approval transaction.

29. A method as in claim 15, where said electronic transaction comprises a loan request, involving a co-guarantor, and approval transaction.

30. A method as in claim 15, where said electronic transaction comprises a request to open a bank locker.

31. A method as in claim 15, where said electronic transaction comprises an electronic polling application.

32. A method as in claim 15, where said electronic transaction comprises an electronic voting application.

33. A method as in claim 15, where said electronic transaction comprises an electronic will application.

34. A method as in claim 15, where said electronic transaction comprises gaining access to a locked space mediated through a wireless mobile communications device.

35. A method as in claim 15, where said electronic transaction comprises an electronic business application involving the participation of a purchaser client and a purchase approval client.

36. A method as in claim 15, where the temporal synchronicity and persistence verification of biometrics signals comprises at least one of identifying, verifying and authenticating biometrics of at least two persons simultaneously.

37. A method as in claim 15, where the temporal synchronicity and persistence verification of biometrics signals comprises at least one of identifying, verifying and authenticating biometrics of at least two persons within a prescribed time period.

38. A method as in claim 15, where the temporal synchronicity and persistence verification of biometrics signals comprises at least one of identifying, verifying and authenticating biometrics of at least two persons that are sampled within a time period.

39. A method as in claim 15, where the temporal synchronicity and persistence verification of biometrics signals comprises at least one of identifying, verifying and authenticating biometrics of at least two persons continuously within a time period.

40. A computer readable computer program carrier, execution of one or more computer programs by at least one computer occurring during a multi-party electronic transaction, said computer program causing, in response to an initiating party at one client computer, an initiation of the multi-party transaction by sending a request to a transaction management server; said computer program causing at said transaction management server, based on a policy defined for the transaction, to contact at least one other client computer associated with at least one other party to the transaction for requesting the parties to provide biometrics signals and generating a challenge to all parties to the transaction; in response to receiving the challenge at the client computers said computer program causing, at each client computer, a combination of provided biometrics signals with challenge response data; said computer program further causing said transaction management server to separate the challenge response data from the biometrics signals and to verify temporal synchronicity and persistence of biometrics signals acquisition between the multiple participating parties as specified by the policy and, if the verification is successful, for certifying the authenticity of the parties to the multi-party electronic transaction requested by the initiating party.

41. A computer readable computer program carrier as in claim 40, where provided biometrics signals comprise compressed video signals having steganographically inserted challenge response data.

* * * * *